US011914829B2

United States Patent
Kakinoki

(10) Patent No.: US 11,914,829 B2
(45) Date of Patent: Feb. 27, 2024

(54) INPUT DETECTION SYSTEM

(71) Applicant: Japan Display Inc., Tokyo (JP)

(72) Inventor: Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/945,525

(22) Filed: Sep. 15, 2022

(65) Prior Publication Data

US 2023/0018822 A1 Jan. 19, 2023

Related U.S. Application Data

(63) Continuation of application No. PCT/JP2021/009079, filed on Mar. 8, 2021.

(30) Foreign Application Priority Data

Mar. 16, 2020 (JP) .................................. 2020-045661

(51) Int. Cl.
*G06F 3/0362* (2013.01)
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05)

(58) Field of Classification Search
CPC .................................................... G06F 3/0446
See application file for complete search history.

(56) References Cited

U.S. PATENT DOCUMENTS

| 5,936,613 A * | 8/1999 | Jaeger ................. G02F 1/13306 345/184 |
|---|---|---|
| 2006/0256090 A1 | 11/2006 | Huppi |
| 2010/0207899 A1* | 8/2010 | Oh ........................ G06F 3/0234 345/184 |
| 2012/0127120 A1* | 5/2012 | Miao ....................... G06F 3/045 345/173 |
| 2013/0002607 A1* | 1/2013 | Bayramoglu ......... G06F 3/0443 345/174 |
| 2016/0209957 A1* | 7/2016 | Jung ....................... G06F 3/017 |
| 2016/0364061 A1* | 12/2016 | Zhao ................... G02F 1/13439 |
| 2017/0153752 A1* | 6/2017 | Kurasawa ......... G02F 1/133512 |

(Continued)

FOREIGN PATENT DOCUMENTS

| JP | 6342105 B1 | 6/2018 |
|---|---|---|
| JP | 6532631 B1 | 6/2019 |
| WO | 2019082478 A1 | 5/2019 |

OTHER PUBLICATIONS

International Search Report of corresponding PCT application PCT/JP2021/009079, dated Apr. 13, 2021.

*Primary Examiner* — Nan-Ying Yang
(74) *Attorney, Agent, or Firm* — K&L Gates LLP

(57) ABSTRACT

An input detection system includes a plurality of detection electrodes arrayed in a detection region, and an input support device that includes an LC circuit, a first electrode coupled to one end side of the LC circuit, and a second electrode coupled to the other end side of the LC circuit. The input support device is disposed to overlap with some of the detection electrodes, a reference potential is supplied to the detection electrode overlapping with the first electrode, and a detection drive signal is supplied to the detection electrode overlapping with the second electrode.

18 Claims, 21 Drawing Sheets

(56) References Cited

U.S. PATENT DOCUMENTS

| | | | |
|---|---|---|---|
| 2020/0249792 A1 | 8/2020 | Katsurahira | |
| 2020/0301547 A1 | 9/2020 | Mori et al. | |
| 2021/0232269 A1 | 7/2021 | Sasaki et al. | |

* cited by examiner

INPUT DETECTION SYSTEM

CROSS-REFERENCE TO RELATED APPLICATION

This application is a continuation of International Patent Application No. PCT/JP2021/009079 filed on Mar. 8, 2021 which designates the United States, incorporated herein by reference, and which claims the benefit of priority from Japanese Patent Application No. 2020-045661 filed on Mar. 16, 2020, incorporated herein by reference.

BACKGROUND

1. Technical Field

The present disclosure relates to an input detection system.

2. Description of the Related Art

Japanese Patent Nos. 6342105 and 6532631 describe an input support device that is placed on a touch panel detecting change in electrostatic capacitance or change in a contact region and supports input operations through the touch panel.

In such an input support device, it is necessary to determine whether a detection target is an input support device or something other than the input support device (e.g., a finger). In Japanese Patent Nos. 6342105 and 6532631, the determination is executed using an input support device provided with three or more of electrodes or combining multiple detection methods. This may complicate the input support device detection.

The present disclosure aims to provide an input detection system that can easily detect an input support device.

SUMMARY

An input detection system according to an embodiment of the present disclosure includes a plurality of detection electrodes arrayed in a detection region, and an input support device that includes an LC circuit, a first electrode coupled to one end side of the LC circuit, and a second electrode coupled to the other end side of the LC circuit. The input support device is disposed to overlap with some of the detection electrodes, a reference potential is supplied to the detection electrode overlapping with the first electrode, and a detection drive signal is supplied to the detection electrode overlapping with the second electrode.

DETAILED DESCRIPTION

Figure 1:
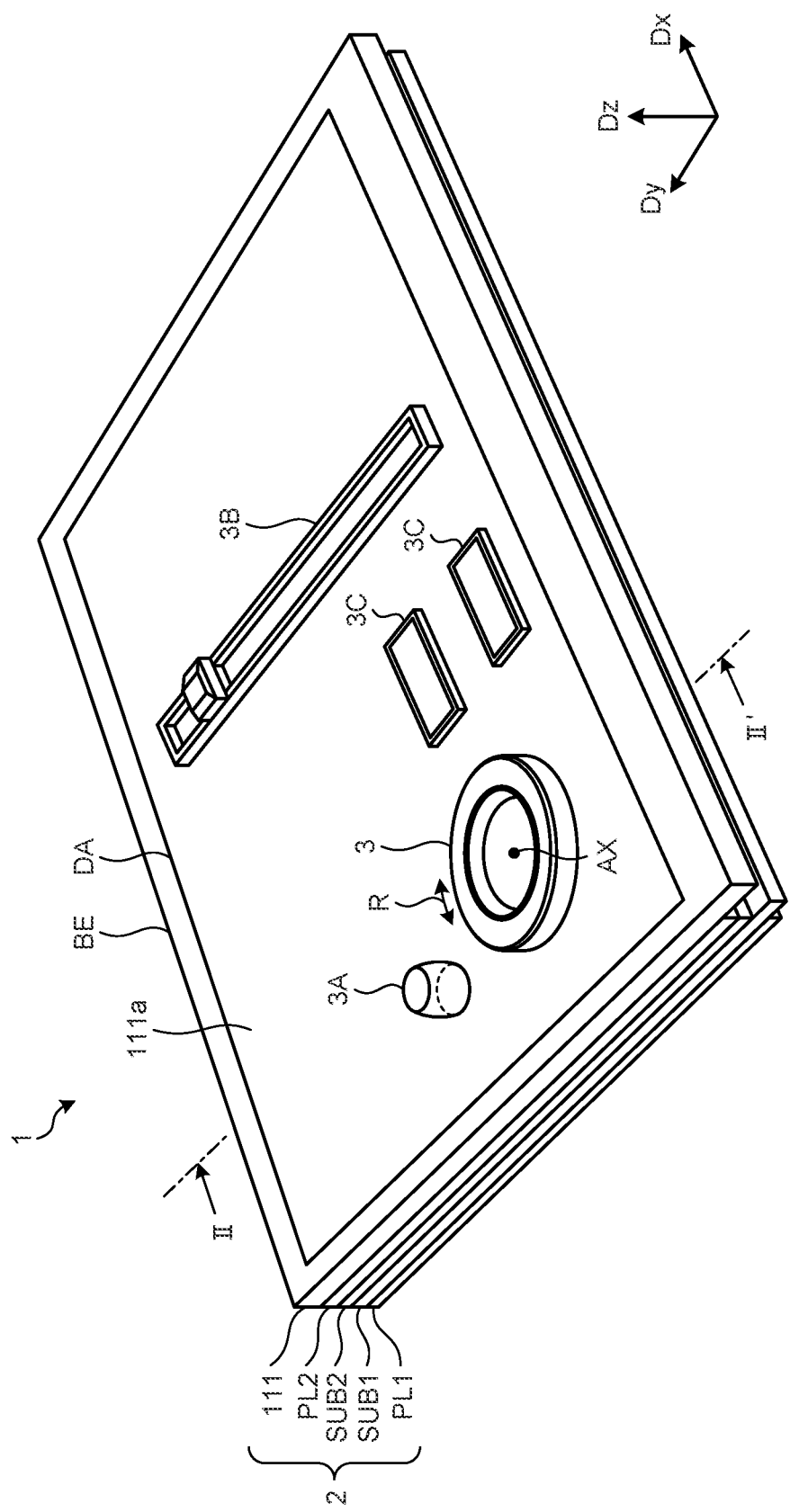
FIG. 1 is a perspective view schematically illustrating an input detection system according to an embodiment.

Aspects for carrying out the present disclosure (embodiment) will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present specification and the drawings, the same reference numerals denote components similar to those described before with reference to the drawing that has been already referred, and detail explanation thereof can be appropriately omitted.

Embodiment

Figure 2:
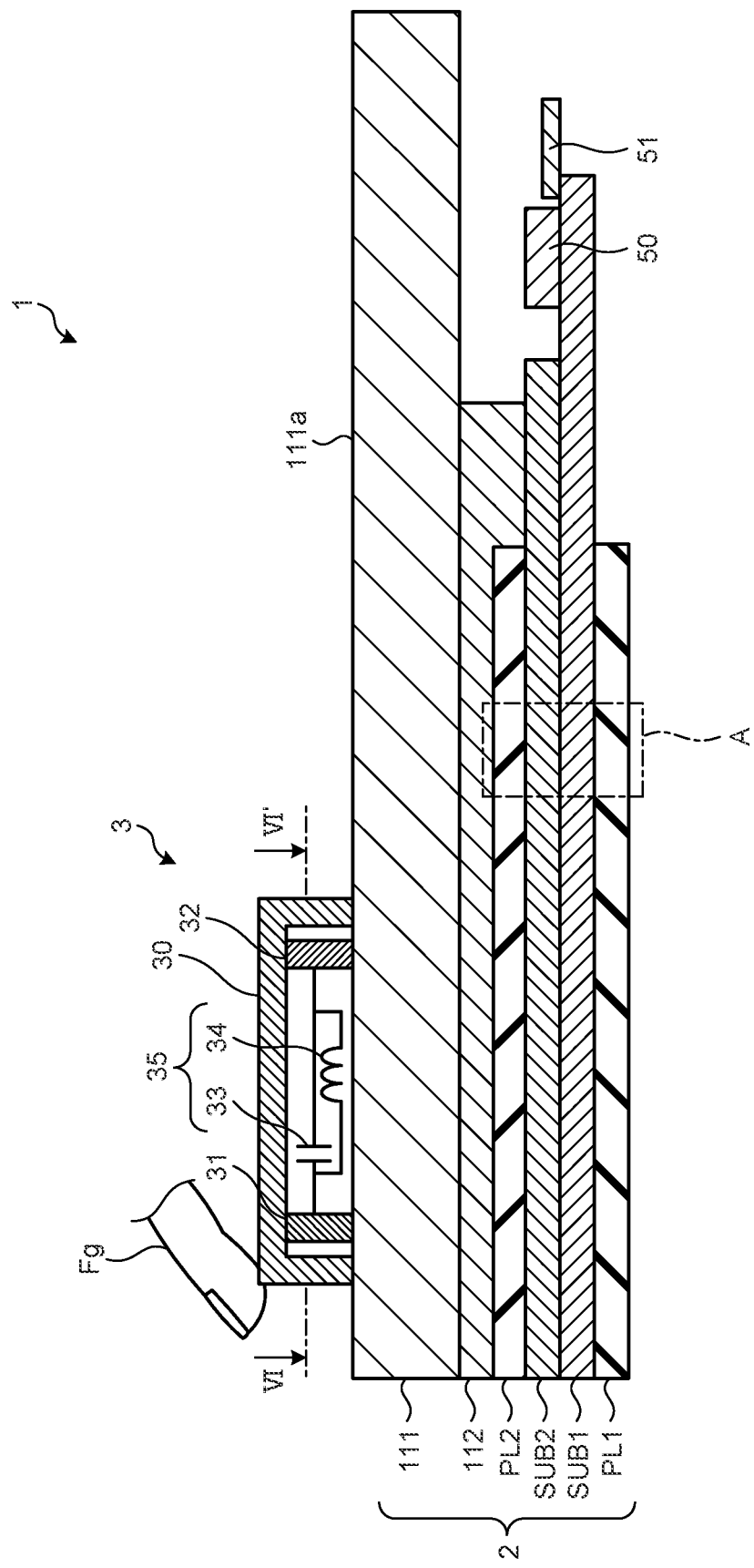
FIG. 2 is a cross-sectional view cut along line II-II' in FIG. 1.

FIG. 1 is a perspective view schematically illustrating an input detection system according to an embodiment. FIG. 2 is a cross-sectional view cut along line II-II' in FIG. 1. As illustrated in FIGS. 1 and 2, this input detection system 1 includes a display device 2 and an input support device 3.

One direction of a plane (an upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

As illustrated in FIG. 1 and FIG. 2, the display device 2 includes the array substrate SUB1, a counter substrate SUB2, a first polarizing plate PL1, a second polarizing plate PL2, a cover member 111, and an adhesive layer 112 (which is omitted in FIG. 1). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr and various wiring lines such as scan lines GL and pixel signal lines SL (refer to FIG. 4) that are provided on the first substrate 10. The counter substrate SUB2, which is provided to face the array substrate SUB1, includes a second substrate 20 as the base body. The counter substrate SUB2 includes color filters CF, a light-shielding layer BM (refer to FIG. 3), and the like that are provided on the second substrate 20. The first substrate 10 and the second substrate 20 are formed of a material having a light transmitting property such as a glass substrate or a resin substrate.

The length of the array substrate SUB1 in the second direction Dy is longer than that of the counter substrate SUB2 in the second direction Dy. As illustrated in FIG. 1, the first substrate 10 has a portion that extends outward from the second substrate 20. The length of the array substrate SUB1 in the second direction Dy is shorter than the length thereof in the first direction Dx. The length of the counter substrate SUB2 in the second direction Dy is shorter than the length thereof in the first direction Dx. The lengths are, however, not limited thereto. The length of the array substrate SUB1 in the second direction Dy may be longer than the length thereof in the first direction Dx. The length of the counter substrate SUB2 in the second direction Dy may be longer than the length thereof in the first direction Dx.

A control integrated circuit (IC) 50 and a wiring substrate 51 are coupled to the extending portion of the array substrate SUB1. The control IC 50 includes a control circuit that controls display of the display device 2 and touch detection. The control IC 50 is not limited to being provided in this manner and may be mounted on the wiring substrate 51. The control IC 50 is not limited to being disposed in this manner and may be provided on a control substrate or a flexible substrate outside the module, for example.

The wiring substrate 51 is a flexible printed circuits (FPC), for example. The wiring substrate 51 is coupled to a plurality of terminals of the first substrate 10.

As illustrated in FIG. 1, a peripheral region BE is provided on the outer side of a display region DA in the display device 2. The display region DA is formed to have a quadrangular shape but the outer shape of the display region DA is not limited thereto. For example, the display region DA may have a substantially square shape with curved corners or may have a cutout. Alternatively, the display region DA may have another polygonal shape or another shape such as a circular shape or an elliptic shape.

The display region DA is a region for displaying an image and in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

The input support device 3 is disposed (mounted) on the upper surface 111a of the cover member 111 for use. A user can perform an input operation on the display device 2 by operating the input support device 3 disposed on the display device 2. The input support device 3 is a rotary knob, for example, and has an annular shape in a plan view when viewed from the upper surface 111a of the display device 2. The display device 2 can detect a position of the input support device 3 in a plane and a rotation operation R centered on a rotation axis AX. In the embodiment, the display region DA is a region in which a plurality of detection electrodes DE are provided and serves also as a detection region.

As illustrated in FIG. 2, the input support device 3 includes a housing 30, a first electrode 31, a second electrode 32, and an LC circuit 35. The housing 30 is formed of an insulating resin material, for example, and is a hollow member having a space therein. The first electrode 31, the second electrode 32, and the LC circuit 35 are provided in the housing 30. The LC circuit 35 is an LC resonance circuit in which a capacitor 33 and an inductor 34 are coupled in parallel with each other. The first electrode 31 is coupled to one end side of the LC circuit 35 (the coupling portion of the capacitor 33 and one end of the inductor 34). The second electrode 32 is coupled to the other end side of the LC circuit 35 (the coupling portion of the capacitor 33 and the other end of the inductor 34). The display device 2 can detect positions of the first electrode 31 and the second electrode 32 using LC resonance of the LC circuit 35.

The housing 30 has an annular shape having a through hole in the region overlapping with the rotation axis AX. The housing 30, however, may have a circular shape having no through hole. In FIG. 2, the housing 30 is illustrated to have a shape having no through hole to illustrate the LC circuit 35 schematically.

FIG. 1 illustrates a plurality of input support devices 3A, 3B, and 3C as other examples of the input support device 3. The input support device 3A, which is a rotary knob, is formed in a tab shape having no through hole unlike the input support device 3. The input support device 3B, which is a slider, allows an input operation to be performed by displacing a tab thereof in a plane. The input support device 3B has a bar-like shape in a plan view. The input support device 3C, which is a button or an input key, allows an input operation to be performed by performing a touch operation thereon or performing a press—in operation thereon. The input detection system 1 is not limited to having all of the input support devices 3, 3A, 3B, and 3C. The input detection system 1 may have at least one of the input support devices 3, 3A, 3B, and 3C. The following explains the input support device 3. The explanation of the input support device 3 can be applied also to the other input support devices 3A, 3B, and 3C.

Figure 3:
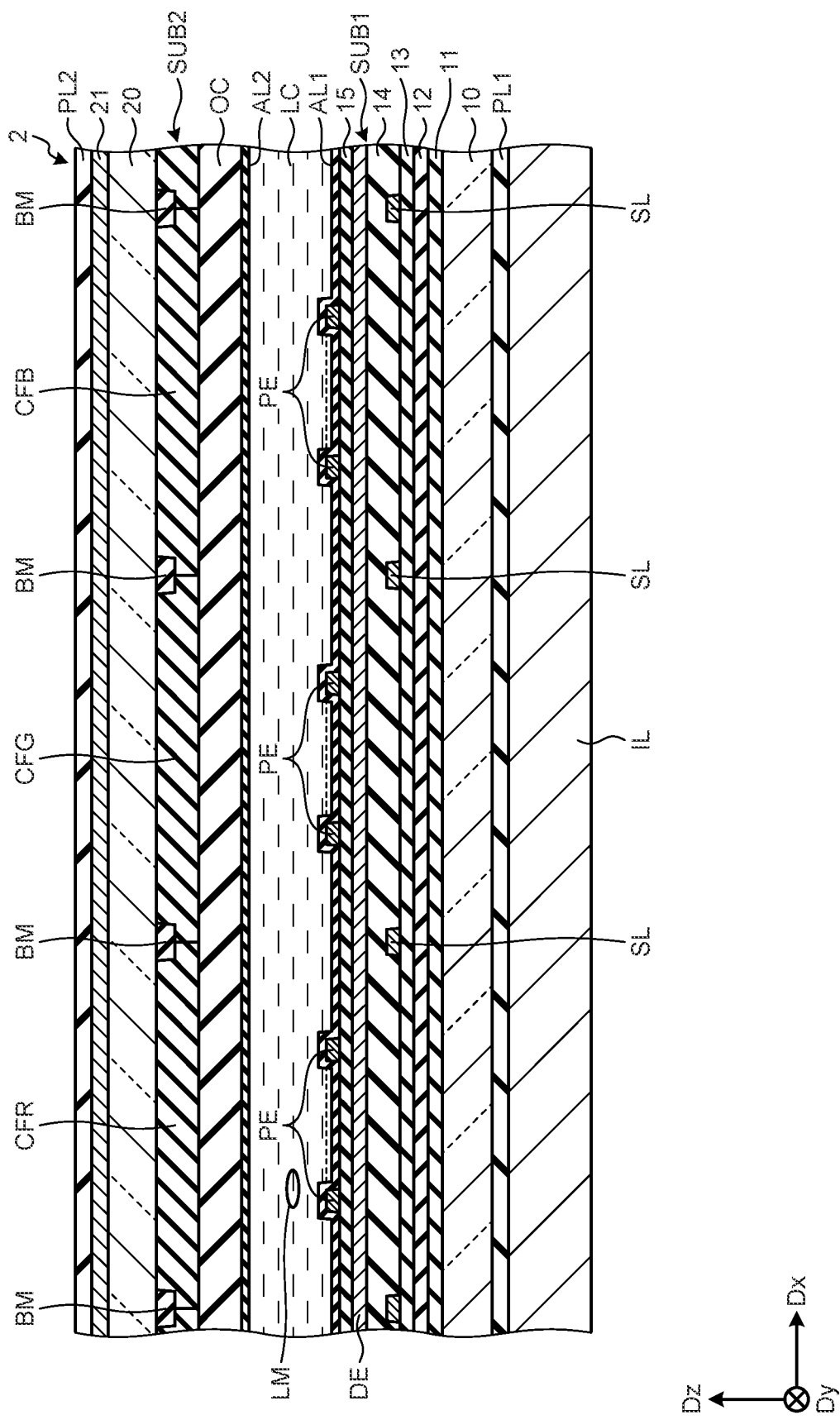
FIG. 3 is a cross-sectional view illustrating a schematic cross-sectional structure of a display device.

FIG. 3 is a cross-sectional view illustrating a schematic cross-sectional structure of the display device. FIG. 3 illustrates a cross-sectional view of a region A in FIG. 2, for example. As illustrated in FIG. 3, the display device 2 further includes a lighting device IL. The counter substrate SUB2 is disposed to face the array substrate SUB1 in a direction perpendicular to a surface of the array substrate SUB1. A liquid crystal layer LC is provided between the array substrate SUB1 and the counter substrate SUB2. The liquid crystal layer LC serving as a display function layer is provided between the first substrate 10 and the second substrate 20. The lighting device IL, the first polarizing plate PL1, the array substrate SUB1, the counter substrate SUB2, and the second polarizing plate PL2 are stacked in this order in the third direction Dz.

The array substrate SUB1 faces the lighting device IL while the counter substrate SUB2 is located on a side adjacent to the display surface. The lighting device IL emits light toward the array substrate SUB1. Applicable examples of the lighting device IL include a sidelight type backlight and a downlight type backlight. Various types of lighting devices IL can be applied, but their detailed structures are omitted from the explanation.

The optical element including the first polarizing plate PL1 faces the first substrate 10. More specifically, the first polarizing plate PL1 is disposed on the outer surface or the surface facing the lighting device IL of the first substrate 10. The optical element including the second polarizing plate PL2 faces the second substrate 20. More specifically, the second polarizing plate PL2 is disposed on the outer surface or on the surface on the observation position side of the second substrate 20. A first polarizing axis of the first polarizing plate PL1 and a second polarizing axis of the second polarizing plate PL2 are in relation of a crossed nicoles in the X-Y plane, for example. The optical element including the first polarizing plate PL1 and the optical element including the second polarizing plate PL2 may include other optical functional elements such as retardation plates.

The array substrate SUB1 includes insulating films 11, 12, 13, 14, 15, the pixel signal lines SL, pixel electrodes PE, the detection electrodes DE, a first alignment film AL1, and the like on the side of the first substrate 10, the side facing the counter substrate SUB2.

In this specification, the direction from the first substrate 10 to the second substrate 20 in the direction perpendicular to the first substrate 10 is referred to as an "up side" or simply an "up". The direction from the second substrate 20 to the first substrate 10 is referred to as a "down side" or simply a "down". The term "plan view" refers to the positional relation when viewed from a direction perpendicular to the first substrate 10.

The insulating film 11 is provided on the first substrate 10. The insulating films 11, 12, 13, and 15 are inorganic insulating films formed of an inorganic material having a light transmitting property such as silicon oxide or silicon nitride, for example.

The insulating film 12 is provided on the insulating film 11. The insulating film 13 is provided on the insulating film 12. The pixel signal lines SL are provided on the insulating film 13. The insulating film 14 is provided on the insulating film 13 and covers the pixel signal lines SL. The insulating film 14 is formed of a resin material having a light transmitting property and has a thickness larger than those of other insulating films formed of inorganic materials. The scan lines GL, which are not illustrated in FIG. 3, are provided on the insulating film 12, for example.

The detection electrodes DE are provided on the insulating film 14. The detection electrodes DE are provided in the display region DA and are separated from one another by slits. The detection electrodes DE are covered by the insulating film 15. The detection electrode DE serves also as both detection electrode for touch detection and common electrode in display.

The pixel electrodes PE are provided on the insulating film 15 and face the detection electrodes DE with the insulating film 15 therebetween. The pixel electrodes PE and the detection electrodes DE are formed of a conductive material having a light transmitting property such as indium tin oxide (ITO) or indium zinc oxide (IZO), for example. The pixel electrodes PE and the insulating film 15 are covered by the first alignment film AL1.

The counter substrate SUB2 includes a light-shielding layer BM, color filters CFR, CFG, CFB, an overcoat layer OC, a second alignment film AL2, and the like on the side of the second substrate 20, the side facing the array substrate SUB1. The counter substrate SUB2 includes a conductive layer 21 and the second polarizing plate PL2 on the side of the second substrate 20, the side being opposite the array substrate SUB1 side of the second substrate 20.

In the display region DA, the light-shielding layer BM is located on the side of the second substrate 20, the side facing the array substrate SUB1. The light-shielding layer BM defines the openings each facing one of the pixel electrodes PE. The pixel electrodes PE are separated from one another such that each pixel electrode PE corresponds to the opening of one of the pixels PX. The light-shielding layer BM is formed of a black resin material or a metallic material having a light-shielding property.

The color filters CFR, CFG, and CFB are each located on the side of the second substrate 20, the side facing the array substrate SUB1, and their edges overlap with the light-shielding layer BM. For example, the color filters CFR, CFG, and CFB are formed of resin materials colored in red, green, and blue, respectively.

The overcoat layer OC covers the color filters CFR, CFG, and CFB. The overcoat layer OC is formed of a resin material having a light transmitting property. The second alignment film AL2 covers the overcoat layer OC. The first alignment film AL1 and the second alignment film AL2 are formed of a material that exhibits a horizontal alignment property, for example.

The conductive layer 21 is provided on the second substrate 20. The conductive layer 21 is a conductive material having a light transmitting property such as ITO, for example. Static electricity applied from the outside or charged to the second polarizing plate PL2 flows through the conductive layer 21. The display device 2 can remove static electricity in a short time and reduce static electricity applied to the liquid crystal layer LC, which is the display layer. The conductive layer 21 may not be provided.

The array substrate SUB1 and the counter substrate SUB2 are arranged such that the first alignment film AL1 and the second alignment film AL2 face each other. The liquid crystal layer LC is sealed between the first alignment film AL1 and the second alignment film AL2. The liquid crystal layer LC contains a negative liquid crystal material having a negative dielectric anisotropy or a positive liquid crystal material having a positive dielectric anisotropy.

For example, when the liquid crystal layer LC is a negative liquid crystal material and no voltage is applied to the liquid crystal layer LC, liquid crystal molecules LM are initially oriented in the X-Y plane such that their long axes are along the first direction Dx. When a voltage is applied to the liquid crystal layer LC, i.e., at an on state at which an electric field is formed between the pixel electrode PE and the detection electrode DE, the liquid crystal molecules LM change their orientation states under the influence of the electric field. At the on state, incident linearly polarized light changes its polarization state in accordance with the orientation state of the liquid crystal molecules LM when it passes through the liquid crystal layer LC.

Figure 4:
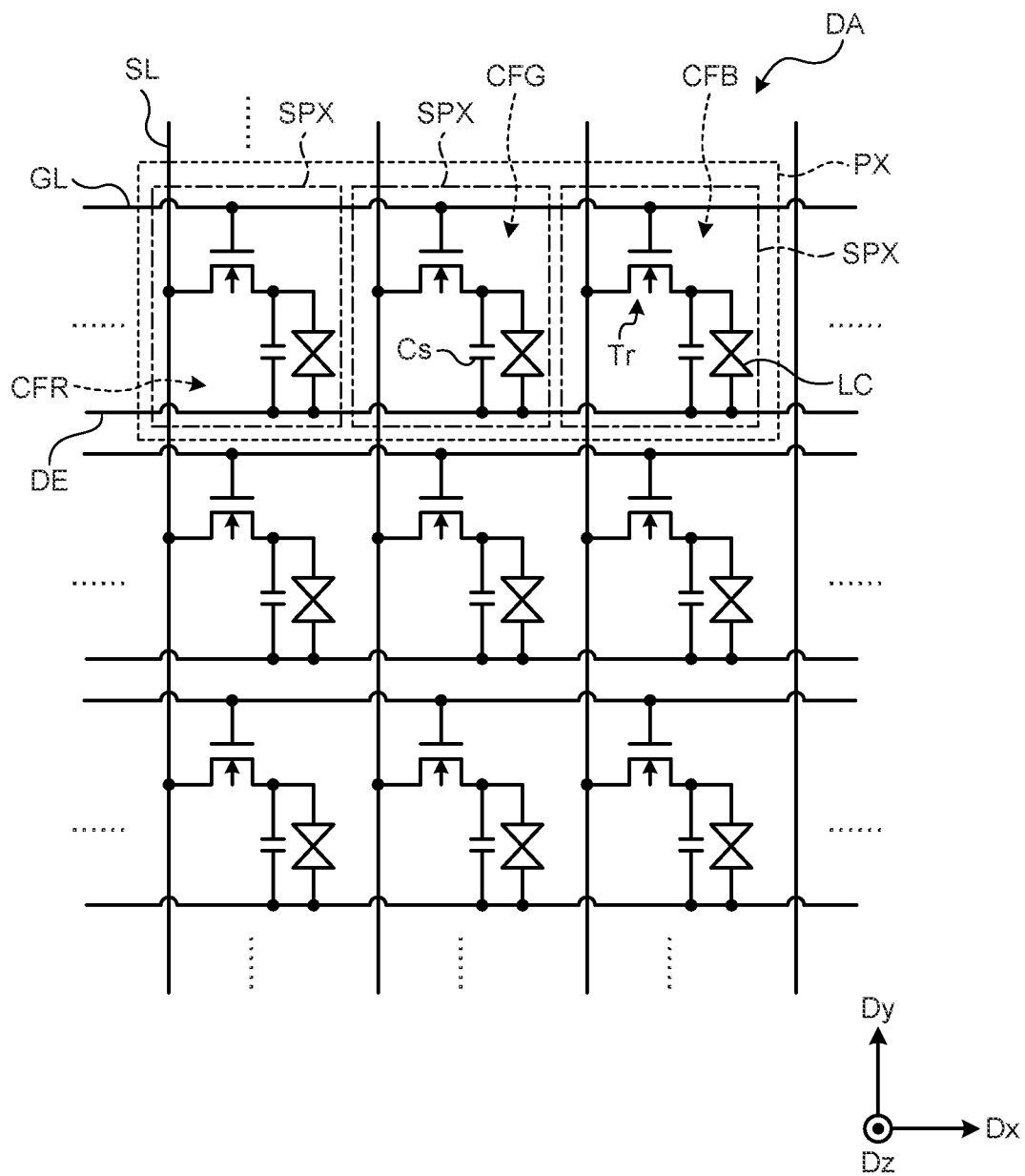
FIG. 4 is a circuit diagram illustrating a pixel array in a display region.

FIG. 4 is a circuit diagram illustrating a pixel array in the display region. The switching elements Tr each included in one of sub-pixels SPX, the pixel signal lines SL, the scan lines GL, and the like that are illustrated in FIG. 4 are formed in the array substrate SUB1. The pixel signal lines SL extend in the second direction Dy. The pixel signal lines SL are wiring lines that supply a pixel signal VSG to each pixel electrode PE (refer to FIG. 3). The scan lines GL extend in the first direction Dx. The scan lines GL are wiring lines that supply a drive signal (a scan signal VGL) driving each switching element Tr.

The pixel PX includes multiple sub-pixels SPX. Each sub-pixel SPX has the switching element Tr and a capacitance of the liquid crystal layer LC. The switching element Tr is a thin-film transistor. In this example, the switching element Tr is an n-channel metal oxide semiconductor (MOS) type TFT. The insulating film 15 is provided between the pixel electrodes PE and the detection electrodes DE illustrated in FIG. 3, resulting in a holding capacitance Cs illustrated in FIG. 4 being formed.

In the color filters CFR, CFG, and CFB, color regions colored in three colors of red (R), green (G), and blue (B) are periodically arrayed, for example. Each of the color regions colored in three colors of R, G, and B corresponds to one of the sub-pixels SPX to be a set.

As a result, the pixel PX is composed of a set of sub-pixels SPX corresponding to the three color regions. The color filters may correspond to four or more of color regions. In this case, the pixel PX may include four or more of sub-pixels SPX.

Figure 5:
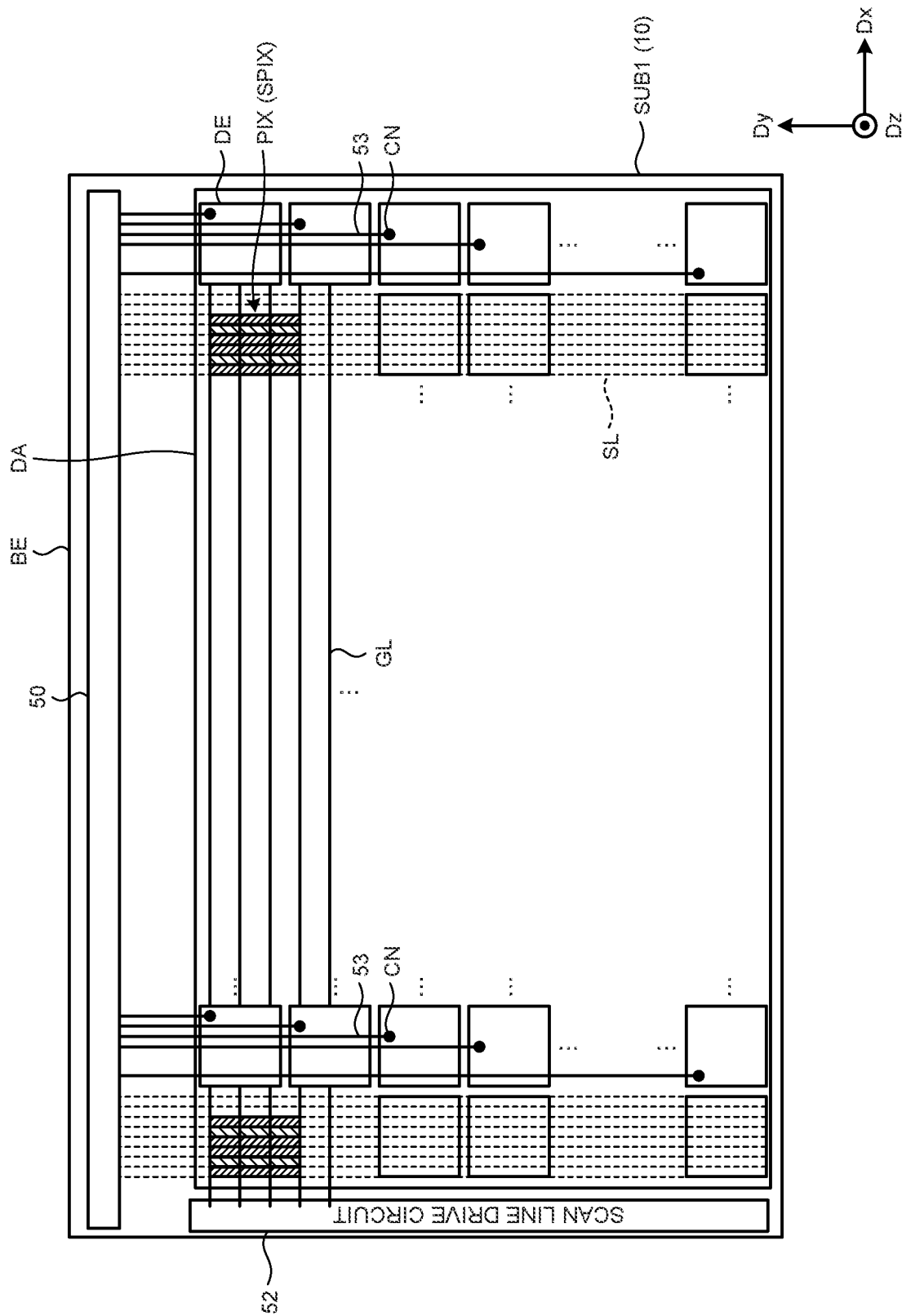
FIG. 5 is a plan view schematically illustrating an array substrate included in the display device.

FIG. 5 is a plan view schematically illustrating the array substrate included in the display device. As illustrated in FIG. 5, the pixels PIX (the sub pixels SPX) and the detection electrodes DE are arrayed in a matrix with a row-column configuration in the display region DA. The pixel signal lines SL and the scan lines GL are provided to correspond to the pixel electrodes PE included in the sub-pixels SPX. The pixel signal lines SL are coupled to a control circuit such as the control IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 supplies the scan signal VGL for driving the switching element Tr of each pixel PIX (each sub pixel SPX) to the scan lines GL.

Detection electrode drive wiring lines 53 are each provided to one of the detection electrodes DE. The detection electrode drive wiring line 53 is coupled to the detection electrode DE through a contact hole CN. The detection electrode drive wiring lines 53 extend along the second direction Dy and are arrayed in the first direction Dx. The detection electrode drive wiring lines 53 and the pixel signal lines SL are coupled to the control IC 50 provided in the peripheral region BE.

FIG. 5 illustrates only part of the detection electrodes DE and part of the pixels PIX (the sub pixels SPX) for easier viewing. The detection electrodes DE and the pixels PIX are, however, arranged in the entire display region DA. The pixels PIX are arranged to overlap with one drive electrode DE. The detection electrode drive wiring lines 53 are arranged to overlap with the pixel signal lines SL. The detection electrode drive wiring lines 53 are formed in a layer different from the layers including the pixel signal lines SL and the scan lines GL with an insulating film therebetween.

The detection electrodes DE serve as both common electrode in display and detection electrodes for detecting the detection target such as a finger Fg, the input support device 3, or the like. Specifically, the control IC 50 supplies a display drive signal VCOM to the detection electrodes DE in display. In touch detection, which detects the position of the finger Fg, the control IC 50 supplies a detection drive signal VD to the detection electrodes DE and detects the contact or proximity of the finger Fg on the basis of a change in self-electrostatic capacitance of the detection electrode DE. In input support device detection, which detects the input support device 3, the control IC 50 supplies the detection drive signal VD to the detection electrodes DE, and detects the position and the like of the input support device 3 utilizing a change in the self-electrostatic capacitance of the detection electrode DE and resonance of the LC circuit 35 of the input support device 3.

Figure 6:
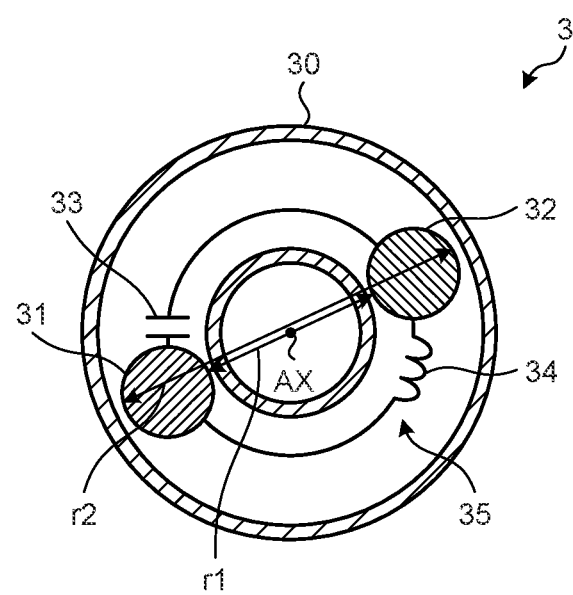
FIG. 6 is a cross-sectional view cut along line VI-VI' in FIG. 2.

FIG. 6 is a cross-sectional view cut along line VI-VI' in FIG. 2. FIG. 6 schematically illustrates a cross-sectional view of the input support device 3 cut along a plane parallel to the upper surface 111a (refer to FIG. 1). As illustrated in FIG. 6, the input support device 3 has a circular shape in a plan view. The first electrode 31 and the second electrode 32 are arranged on the opposite sides across the rotation axis AX in a plan view. The first electrode 31 and the second electrode 32 each have a circular shape in a plan view. The shapes of the first electrode 31 and the second electrode 32 are not limited thereto, and may be other shapes such as square shapes and polygonal shapes. The first electrode 31 and the second electrode 32 may have different shapes. In the following explanation, the shortest distance between the first electrode 31 and the second electrode 32 is referred to as a first distance r1. The most distant distance between the first electrode 31 and the second electrode 32 is referred to as a second distance r2.

FIG. 6 equivalently illustrates the capacitor 33 and the inductor 34 that are included in the LC circuit 35. The LC circuit 35 may be formed by integrated circuit components mounted on a substrate, for example. It is sufficient that the capacitor 33 and the inductor 34 are coupled electrically in parallel between the first electrode 31 and the second electrode 32, and arrangement thereof in the housing 30 may be desirably set.

Figure 7:
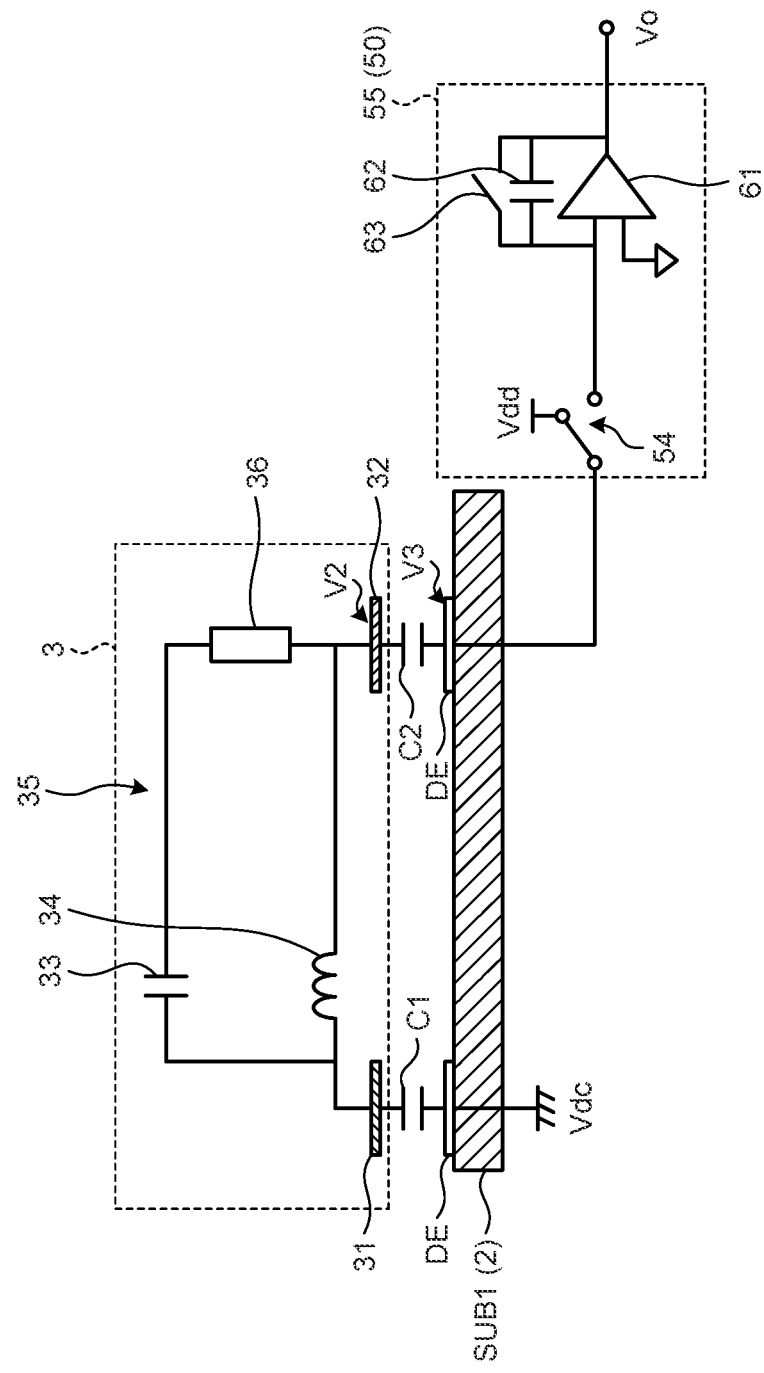
FIG. 7 is a descriptive view for explaining a method for detecting an input support device.
Figure 8:
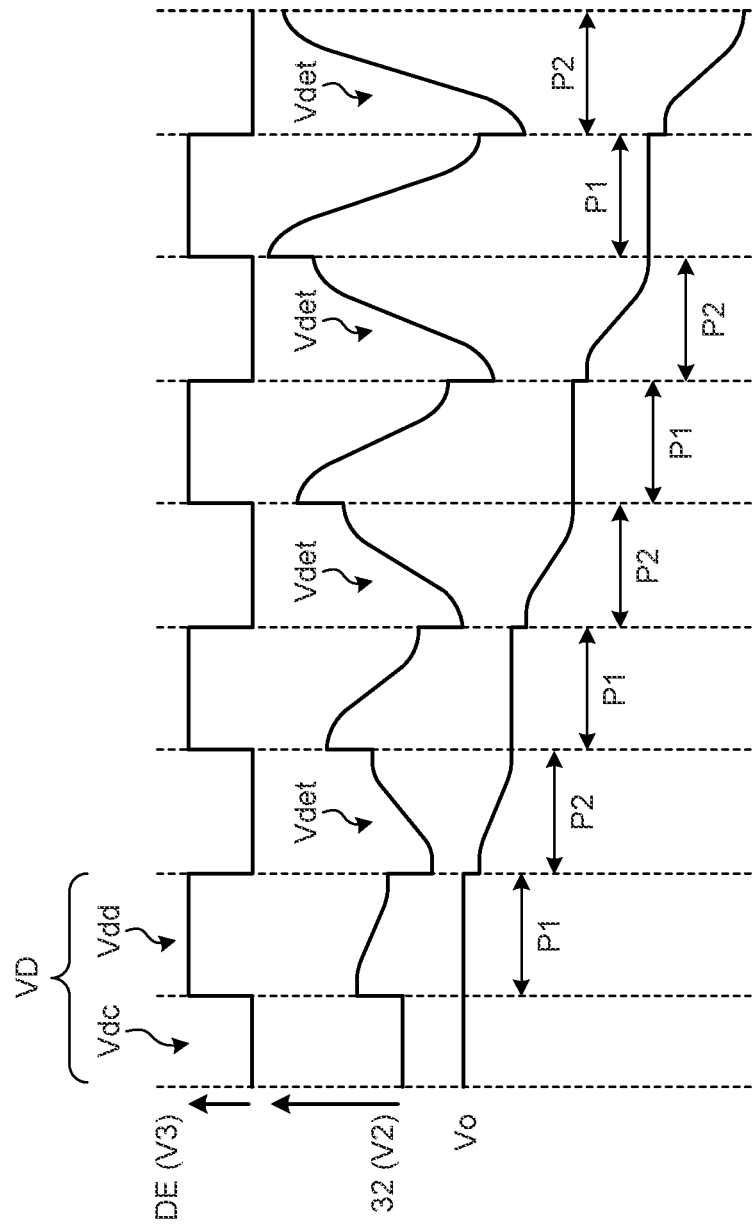
FIG. 8 is a timing waveform chart for explaining the method for detecting the input support device.

FIG. 7 is a descriptive view for explaining a method for detecting the input support device. FIG. 8 is a timing waveform chart for explaining the method for detecting the input support device. As illustrated in FIG. 7, the first electrode 31 and the second electrode 32 of the input support device 3 each face the detection electrode DE in the array substrate SUB1. A capacitance C1 is formed between the first electrode 31 and one detection electrode DE. The one detection electrode DE is coupled to a reference potential (e.g., a reference potential Vdc). A capacitance C2 is formed between the second electrode 32 and the other detection electrode DE. The other detection electrode DE is coupled to one input of a detection circuit 55 or a power supply potential Vdd via a switch element 54. The other input of the detection circuit 55 is supplied with the reference potential Vdc, for example. The detection circuit 55 is an integration circuit using an operational amplifier, for example. One input of the integration circuit is the inverting input of the operational amplifier while the other input of the integration circuit is the non-inverting input of the operational amplifier, for example.

The detection circuit 55, which is a signal processing circuit provided in the control IC 50, receives a detection signal Vdet (refer to FIG. 8) output from the detection electrode DE, performs predetermined signal processing thereon, and outputs an output voltage Vo. The detection circuit 55 includes a detection signal amplifier 61, a capacitive element 62, and a reset switch 63. The detection circuit 55 is not limited thereto and may further include an A/D conversion circuit (not illustrated) that converts an analog signal output from the detection signal amplifier 61 into a digital signal. In FIG. 7, the LC circuit 35 of the input support device 3 has a resistive element 36 coupled in series with the capacitor 33. The resistive element 36, however, may not be included.

As illustrated in FIGS. 7 and 8, the detection drive signal VD of alternate rectangular waves is supplied to the other detection electrode DE by a switching operation of the switch element 54. The detection drive signal VD alternates between the power supply potential Vdd having a high level potential and the reference potential Vdc having a low level potential at a predetermined frequency. The predetermined frequency is the resonant frequency of the LC circuit 35, for example. A potential V3 of the other detection electrode DE is the amplitude of the detection drive signal VD. As the other detection electrode DE is driven at a frequency closer to the resonant frequency of the LC circuit 35, the degree of increase in the voltage (amplitude) of the second electrode 32 is increased. Periods that are repeated in synchronization with the detection drive signal VD are referred to a first period P1 and a second period P2. The first period P1 is the period during which the other detection electrode DE is coupled to the power supply potential Vdd. The second period P2 is the period during which the other detection electrode DE is coupled to the detection circuit 55.

The detection electrode DE outputs the detection signal Vdet on the basis of the self-electrostatic capacitance. Specifically, as described above, the one detection electrode DE is coupled to the reference potential (e.g., the reference potential Vdc). As a result, during the first period P1, signals with different potentials are thereby supplied to the first electrode 31 and the second electrode 32. During the second period P2, a change in the potential V2 based on the self-electrostatic capacitance is output to the detection circuit 55 as the detection signal Vdet. The detection signal VD has substantially the same frequency as the resonant frequency of the LC circuit 35. The second electrode 32 overlapping with the other detection electrode DE is also driven at the resonant frequency. As a result, the LC circuit 35 resonates. The amplitudes of the detection signals Vdet are thus increased as the first period P1 and the second period P2 are repeated.

During the second period P2, the other detection electrode DE is coupled to the detection circuit 55 by the operation of the switch element 54. The detection signal amplifier 61 of the detection circuit 55 amplifies the detection signal Vdet supplied from the second electrode 32. The reference voltage having a fixed potential is input to the non-inverting input of the detection signal amplifier 61 while the other detection electrode DE is coupled to the inverting input terminal. In the embodiment, the same signal as that coupled to the one detection electrode DE is input as the reference voltage. The detection circuit 55 can reset charges of the capacitive element 62 by turning the reset switch 63 on.

As illustrated in FIG. 8, the amplitudes of the detection signals Vdet are increased and the potential of the output signal Vo from the detection circuit 55 varies to be decreased as the detection drive signal VD is repeatedly supplied a plurality of number of times. In other words, the charges accumulated in the capacitive element 62 of the integration circuit included in the detection circuit 55 increases as the voltage (amplitude) of the second electrode 32 is increased, but the charges accumulated in the capacitive element 62 of the integration circuit are added for the repetition of the second period P2. As a result, the output voltage Vo of the integration circuit included in the detection circuit 55 goes down (the absolute value of the output voltage Vo is increased).

When the detection target different from the input support device 3, such as the finger Fg, comes into contact with or close to the upper surface 111a (refer to FIG. 1), the detection signal Vdet varies in accordance with a change in electrostatic capacitance formed between the finger Fg and the detection electrode DE. In other words, when the detection target is the finger Fg or the like, the amplitude of the detection signal Vdet varies differently from a temporal change in amplitude of the detection signal Vdet as illustrated in FIG. 8, and the voltage of the output voltage Vo is also different from that illustrated in FIG. 8. The input detection system 1 can thus determine whether the detection target is the finger Fg or the input support device 3 using the LC resonance of the LC circuit 35.

Figure 9:
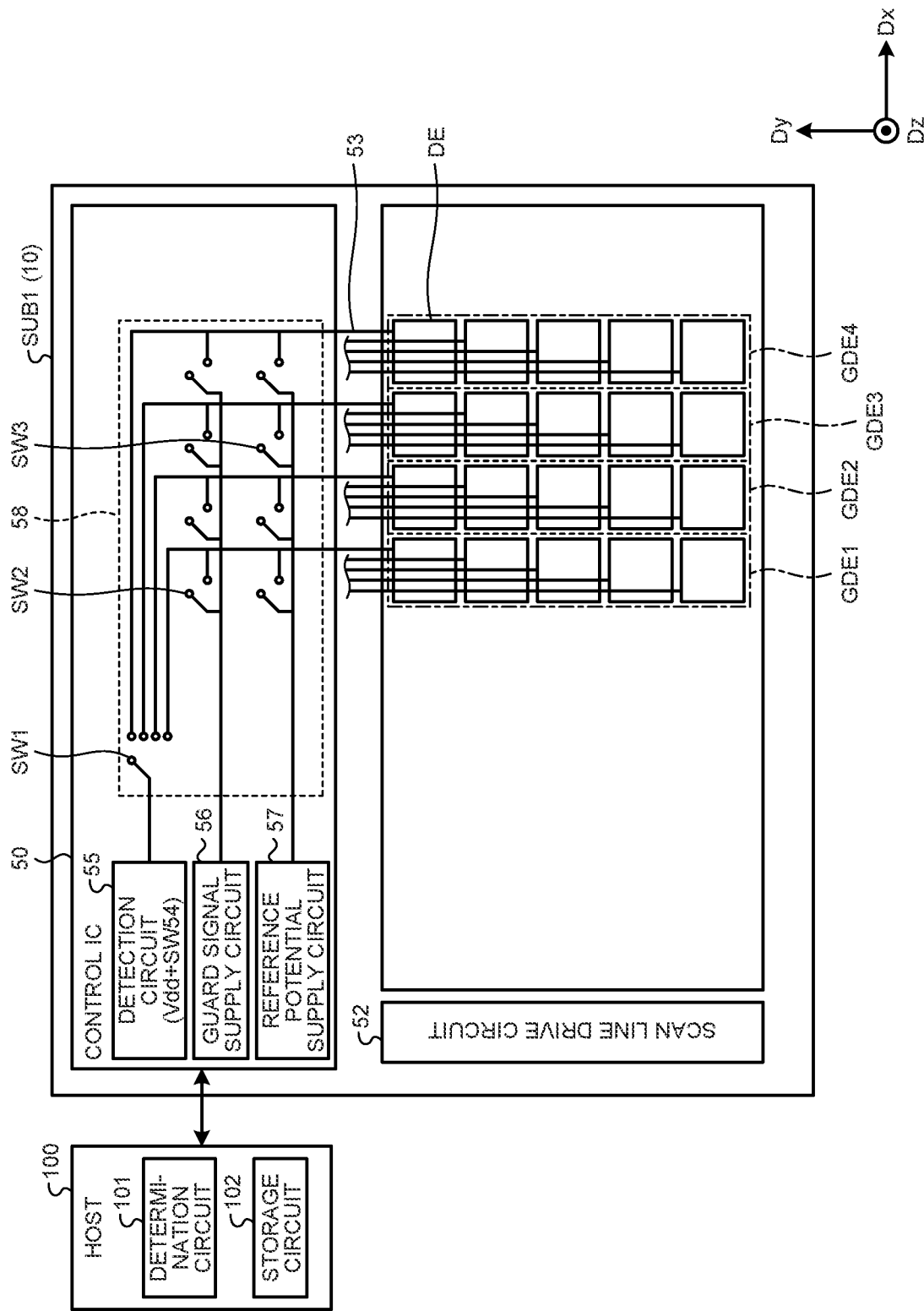
FIG. 9 is a block diagram schematically illustrating the array substrate and a control IC.

FIG. 9 is a block diagram schematically illustrating the array substrate and the control IC. As illustrated in FIG. 9, the control IC 50 includes a guard signal supply circuit 56, a reference potential supply circuit 57, and a drive wiring line coupling circuit 58, in addition to the detection circuit 55 described above. The guard signal supply circuit 56 supplies a guard signal VG to the detection electrodes DE and the like. The guard signal VG, which is synchronized with the detection drive signal VD, is a voltage signal of alternate rectangular waves with substantially the same potential or substantially the same amplitude as the detection drive signal VD. The reference potential supply circuit 57 supplies the reference potential Vdc, which is a direct-current voltage, to the detection electrodes DE, and the like. The voltage supplied from the reference potential supply circuit 57 to the detection electrodes DE and the like may be a direct-current voltage other than the reference potential Vdc. Floating can be used instead of the guard signal VG.

The drive wiring line coupling circuit 58 is a switch circuit having a plurality of switches SW1, SW2, and SW3. The drive wiring line coupling circuit 58 is a multiplexer, for example. The drive wiring line coupling circuit 58 switches the coupling states between the detection electrode drive wiring line 53 and each of the detection circuit 55, the guard signal supply circuit 56, and the reference potential supply circuit 57 that are provided in the control IC 50.

Specifically, the switch SW1 switches the coupling states between the detection circuit 55 and the detection electrode drive wiring line 53. In FIG. 9, the circuit that supplies the power supply potential Vdd (the detection drive signal VD) and the switch element 54 are included in the detection circuit 55. The switch SW2 switches the coupling states between the reference potential supply circuit 57 and the detection electrode drive wiring line 53. The switch SW3 switches the coupling states between the reference potential supply circuit 57 and the detection electrode drive wiring line 53.

The switches SW1, SW2, and SW3 are provided for each detection electrode drive wiring line 53. When one of the switches SW (e.g., the switch SW1) is turned on (in a coupling state) in the detection electrode drive wiring line 53, the other switches SW (e.g., the switches SW2 and SW3) are turned off (in a non-coupling state). In other words, the detection electrode DE is coupled to one of the detection circuit 55, the guard signal supply circuit 56, and the reference potential supply circuit 57 by the operation of the drive wiring line coupling circuit 58.

FIG. 9 illustrates that the switches SW1, SW2, and SW3 are provided for one detection electrode drive wiring line 53 for each of detection electrode groups GDE1, GDE2, GDE3, and GDE4 to make the drawing easier to view. The arrangement is, however, not limited thereto. The switches SW1, SW2, and SW3 may be each provided for one of the detection electrode drive wiring lines 53 to make it possible to switch the couplings between various circuits such as the detection circuit 55 and the detection electrode DE. In the following explanation, the detection electrode groups GDE1, GDE2, GDE3, and GDE4 are electrode groups each composed of a plurality of the detection electrodes DE arrayed in the second direction Dy. When it is not necessary to explain the detection electrode groups GDE1, GDE2, GDE3, and GDE4 by differentiating them from one another, they are simply denoted as the detection electrode groups GDE.

A host IC 100 is a circuit that controls the display device 2. The host IC 100 includes, for example, a calculation circuit that receives the output voltage Vo from the detection circuit 55 and calculates the position (coordinates) of the detection target. The calculation circuit may be included in the control IC 50. The host IC 100 includes a determination circuit 101 and a storage circuit 102. The storage circuit 102 stores therein information about a detection pattern of each of the finger Fg and the input support devices 3, 3A, 3B, 3C in a table form. The determination circuit 101 compares the detection pattern calculated by the calculation circuit with the information from the storage circuit 102 to determine which detection target is detected. The host IC 100 outputs a command to the display device 2 to cause the display device 2 to perform the operation corresponding to the input operation in accordance with the information about the type of the detection target from the determination circuit 101.

In what is called a self-electrostatic capacitance type touch detection, which does not use the resonance of the LC circuit 35, the detection drive signal VD is supplied to all of the detection electrodes DE in the display region DA at the same time. When the input support device 3 is detected by the self-electrostatic capacitance type, the detection electrode DE with which the first electrode 31 overlaps, and the detection electrode DE with which the second electrode 32 overlaps are driven by the same potential, and the LC circuit 35 does not operate. In other words, it may not be possible to determine whether the detection target is the input support device 3 (the first electrode 31 and the second electrode 32) or the finger Fg, because the change in amplitude of the detection signal Vdet illustrated in FIG. 8 does not occur.

Figure 10:
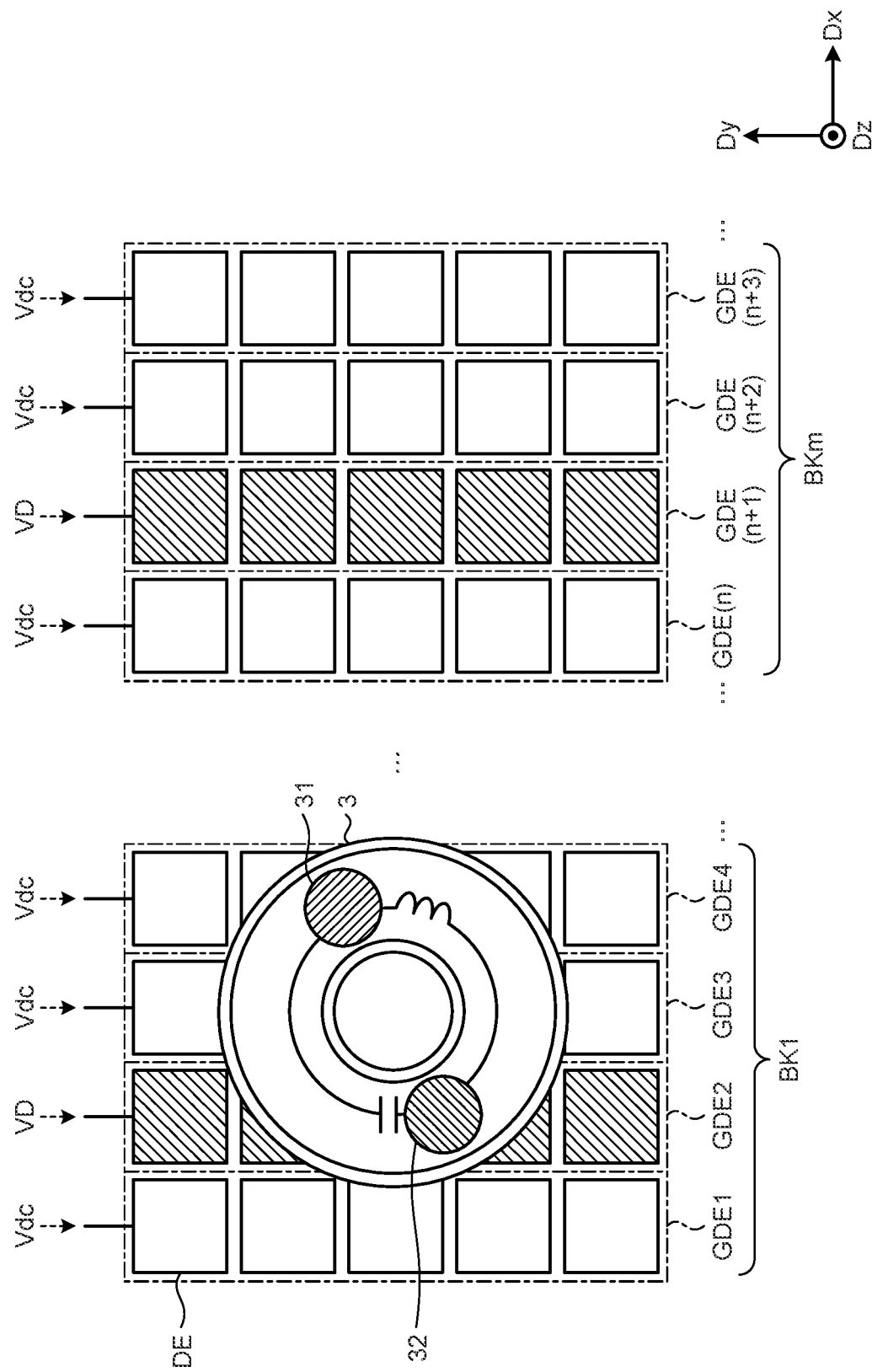
FIG. 10 is a plan view schematically illustrating an arrangement relation between the input support device and a plurality of detection electrodes.

FIG. 10 is a plan view schematically illustrating an arrangement relation between the input support device and the detection electrodes. In FIG. 10, the detection electrodes DE to which the detection drive signal VD is supplied are illustrated with hatching. As illustrated in FIG. 10, the input support device 3 is disposed to overlap with some of the detection electrodes DE. The first electrode 31 is disposed to overlap with at least one (e.g., the detection electrode group GDE4) of the detection electrodes DE. The second electrode 32 is disposed to overlap with the detection electrode DE (e.g., the detection electrode group GDE2) different from the detection electrode DE with which the first electrode 31 overlaps.

The control IC 50 supplies the detection drive signal VD to the detection electrodes DE (e.g., the detection electrode group GDE2) arranged in the second direction Dy at the same time. The control IC 50 supplies the reference potential Vdc to the detection electrodes DE (e.g., the detection electrode groups GDE1, GDE3, GDE4) at the same time, the detection electrodes DE being next to the detection electrode DE to which the detection drive signal VD is supplied in the first direction Dx.

Four detection electrode groups GDE are denoted as a detection electrode block BK. A plurality of detection electrode blocks BK are arrayed in the first direction Dx. The control IC 50 supplies the detection drive signal VD with the identical pattern to each of the detection electrode blocks BK arrayed in the first direction Dx. In the detection electrode block BKm composed of detection electrode groups GDE(n), GDE(n+1), GDE(n+2), and GDE(n+3), the control IC 50 supplies the detection drive signal VD to the detection electrode group GDE(n+1).

The width of the detection electrode block BK in the first direction Dx is larger than the second distance r2 (refer to FIG. 6) between the first electrode 31 and the second electrode 32. The length of one side (width in the first direction Dx) of the detection electrode DE is smaller than the first distance r1 (refer to FIG. 6) between the first electrode 31 and the second electrode 32. In other words, among the detection electrodes DE, the detection electrodes DE (the detection electrode group GDE) to which the detection drive signal VD is supplied at the same time are arrayed in plurality with a predetermined interval (width of the three detection electrodes DE) in the first direction Dx. The distance in the first direction Dx of the two detection electrodes DE (the detection electrode groups GDE) to which the detection drive signal VD is supplied at the same time is larger than the second distance r2 between the first electrode 31 and the second electrode 32 (refer to FIG. 6).

As a result, when the input support device 3 is disposed to overlap with some of the detection electrodes DE, the reference potential Vdc is supplied to the detection electrodes DE overlapping with the first electrode 31 (the detection electrode group GDE4) while the detection drive signal VD is supplied to the detection electrodes DE overlapping with the second electrode 32 (the detection electrode group GDE2). The second electrode 32, thus, can increase the amplitude of the detection signal Vdet using the resonance of the LC circuit 35.

Figure 11:
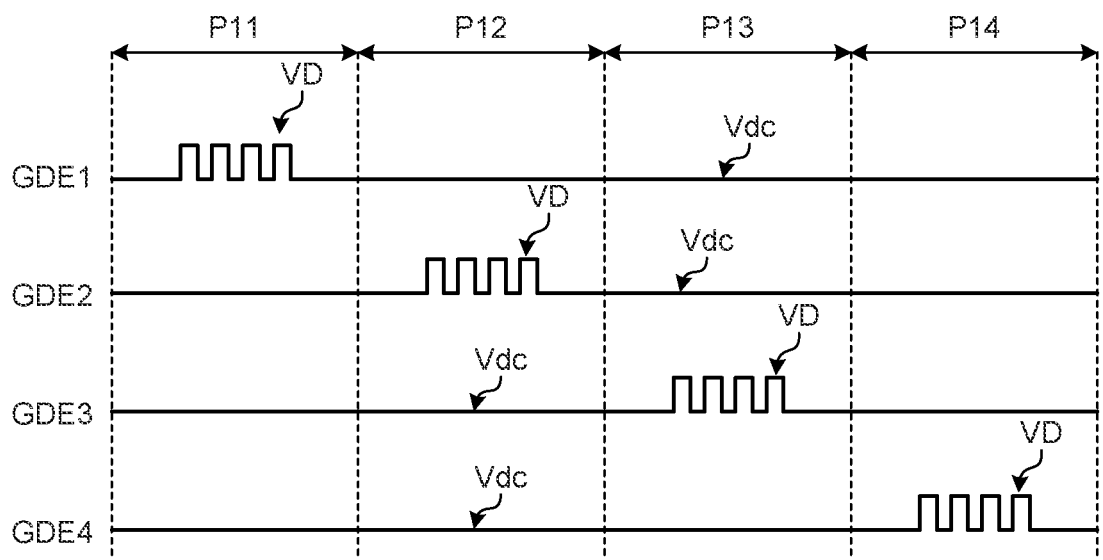
FIG. 11 is a timing waveform chart of a plurality of detection electrode groups.

FIG. 11 is a timing waveform chart of the detection electrode groups. FIG. 11 illustrates only the timing waveform chart of the detection electrode block BK1 (the detection electrode groups GDE1, GDE2, GDE3, and GDE4). The detection electrode blocks BK2, BK3, . . . , and BMm, which are adjacent to the detection electrode block BK1, are also driven with the same timing waveform chart as the detection electrode block BK1.

As illustrated in FIG. 11, in the first period P11, the control IC 50 supplies the detection drive signal VD to the detection electrode group GDE1. The control IC 50 supplies the reference potential Vdc to the detection electrode groups GDE2, GDE3, and GDE4.

In the second period P12, the control IC 50 supplies the detection drive signal VD to the detection electrode group GDE2. The control IC 50 supplies the reference potential Vdc to the detection electrode groups GDE1, GDE3, and GDE4.

In the third period P13, the control IC 50 supplies the detection drive signal VD to the detection electrode group GDE3. The control IC 50 supplies the reference potential Vdc to the detection electrodes GDE1, GDE2, and GDE4.

In the fourth period P14, the control IC 50 supplies the detection drive signal VD to the detection electrode group GDE4. The control IC 50 supplies the reference potential Vdc to the detection electrode groups GDE1, GDE2, and GDE3.

In this way, the input detection system 1 can detect the position of the input support device 3 and the rotational operation R by sequentially scanning the detection electrodes DE (the detection electrode groups GDE) to which the detection drive signal VD is supplied.

In the example described above, the detection drive signal VD is supplied to the detection electrodes DE (the detection electrode group GDE) arrayed in the second direction Dy (a column direction) at the same time. The supplying is not limited to the example. For example, the detection drive signal VD may be supplied to a plurality of the detection electrodes DE arrayed in the first direction Dx (a row direction) at the same time by the operation of the drive wiring line coupling circuit 58.

Figure 12:
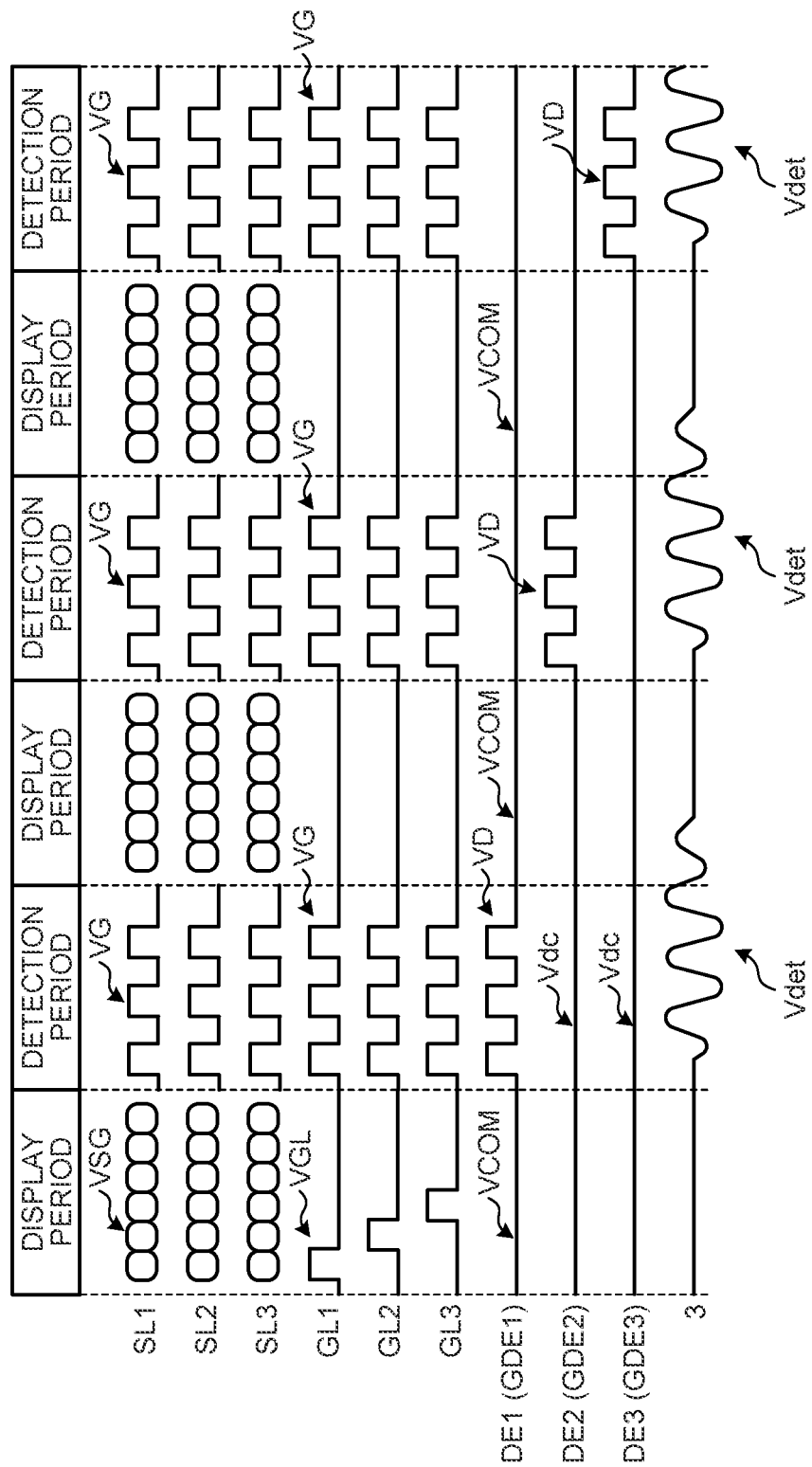
FIG. 12 is a timing waveform chart illustrating a relation between a display period and a detection period.

FIG. 12 is a timing waveform chart illustrating a relation between a display period and a detection period. As illustrated in FIG. 12, in the input detection system 1, the display periods and the detection periods are arranged alternately in a time division manner. FIG. 12 is merely a schematically illustrated timing waveform chart, and the length of each period and the number of pixel signal lines SL, scan lines GL, and detection electrodes DE, for example, are not limited thereto. The display periods and the detection periods may be arranged in any way. For example, display and detection may be repeated every frame.

The scan line drive circuit 52 supplies the scan signal VGL sequentially to the scan lines GL1, GL2, GL3, and the like in the display period. The control IC 50 supplies pixel signals VSG to the pixel signal lines SL1, SL2, SL3, and the like on the basis of the image signal from the host IC 100. The pixel signals VSG are thereby supplied sequentially to the pixels PX selected based on the scan signal VGL, so that an image is displayed. The control IC 50 supplies the display drive signal VCOM to all of the detection electrodes DE during the display period. The detection electrodes DE thereby function as the common electrode in the display period.

In the detection periods, the detection drive signal VD is supplied sequentially to the detection electrode groups GDE1, GDE2, and GDE3 in the same manner as in the first period P11, the second period P12, and the third period P13 that are illustrated in FIG. 11. In FIG. 11, the detection electrode group GDE4 is omitted. The input support device 3 outputs the detection signal Vdet using the resonance of the LC circuit 35. The input support device 3, thus, also outputs the detection signal Vdet during the period overlapping with part of the display period after the end of the detection period.

In the detection period, the guard signal supply circuit 56 (refer to FIG. 9) of the control IC 50 supplies the guard signal VG to the pixel signal lines SL and the scan lines GL. This allows the input detection system 1 to prevent the parasitic capacitance between the detection electrode DE and the pixel signal line SL and the scan line GL, and to detect well the detection target such as the input support device 3, the finger Fg, or the like. The guard signal supply circuit 56 (refer to FIG. 9) is not limited to supplying the guard signal VG to both pixel signal lines SL and scan lines GL. The guard signal VG may be supplied to at least either the pixel signal lines SL or the scan lines GL. The guard signal supply circuit 56 (refer FIG. 9) does not supply the guard signal VG. In this case, the pixel signal lines SL and the scan lines GL are made floating.

The reference potential Vdc supplied to the detection electrode groups GDE during the detection period is a signal of the same potential as the display drive signal VCOM, but is not limited thereto. The reference potential Vdc may be a signal of a different potential from that of the display drive signal VCOM. In the input detection system 1, a potential difference may occur between the first electrode 31 and the second electrode 32 such that the LC circuit 35 resonances. In other words, the detection drive signal VD may be supplied to the detection electrode DE with which the first electrode 31 overlaps while the reference potential Vdc may be supplied to the detection electrode DE with which the second electrode 32 overlaps.

As explained above, the input detection system 1 in the embodiment includes the detection electrodes DE arrayed in the detection region (the display region DA) and the input support device 3. The input support device 3 includes the LC circuit 35, the first electrode 31 coupled to one end side of the LC circuit 35, and the second electrode 32 coupled to the other end side of the LC circuit 35. The input support device 3 is disposed to overlap with some of the detection electrodes DE. The reference potential Vdc is supplied to the detection electrodes DE overlapping with the first electrode 31 while the detection drive signal VD is supplied to the detection electrodes DE overlapping with the second electrode 32.

This allows the input detection system 1 to detect the detection target such as the finger Fg, the input support device 3, or the like by driving the detection electrodes DE with the identical driving method. The input detection system 1 can simply determine whether the detection target is the finger Fg or the input support device 3 using the resonance of the LC circuit 35.

First Modification

Figure 13:
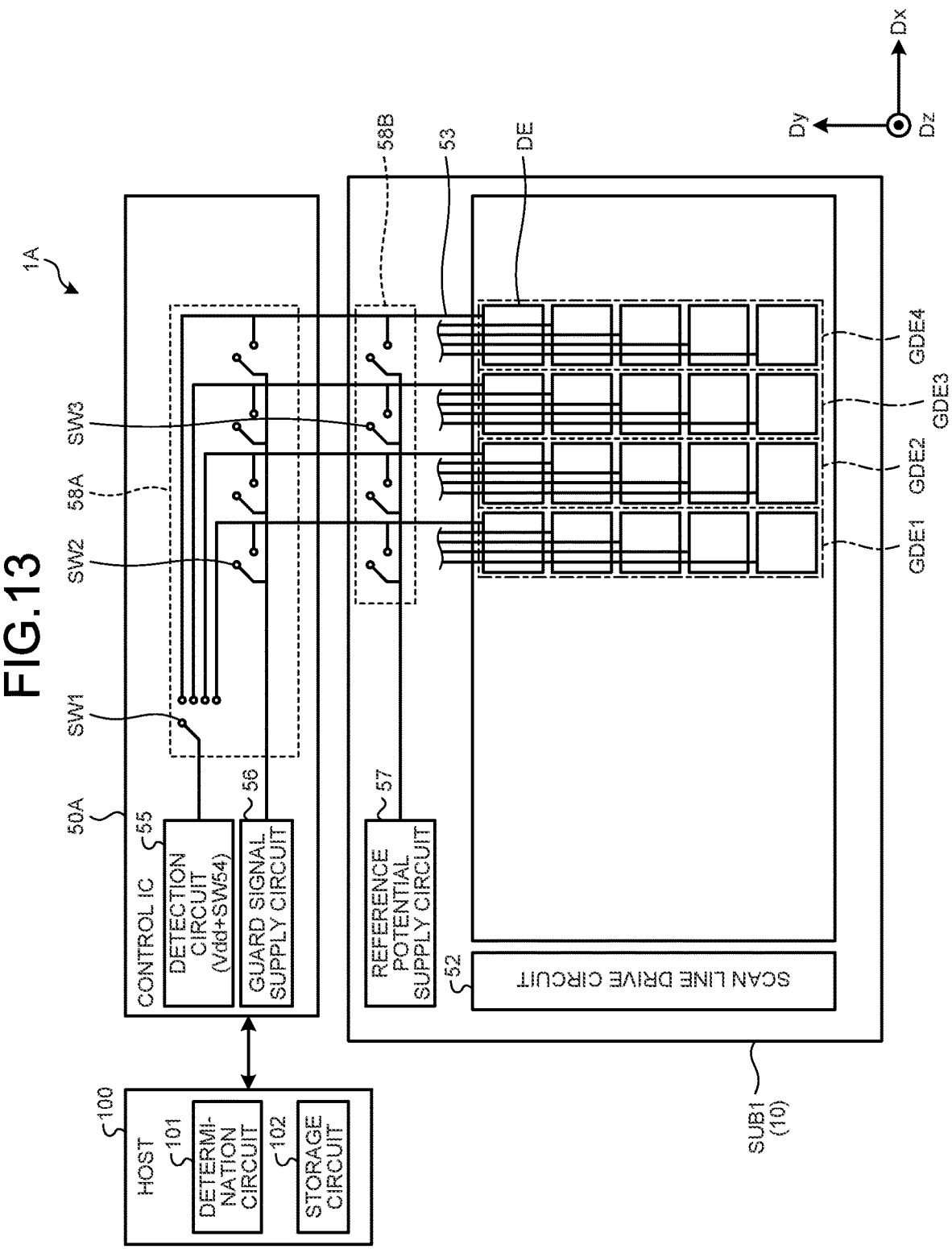
FIG. 13 is a block diagram schematically illustrating the array substrate and the control IC of the input detection system according to a first modification.

FIG. 13 is a block diagram schematically illustrating the array substrate and the control IC of an input detection system according to a first modification. As illustrated in FIG. 13, an input detection system 1A according to the first modification differs from the embodiment described above in that a control IC 50A is provided outside the array substrate SUB1. The control IC 50A is not mounted on the array substrate SUB1, but is provided on the wiring substrate 51 coupled to the array substrate SUB1 (refer to FIG. 2) or a control substrate, for example.

The control IC 50A includes the detection circuit 55, the guard signal supply circuit 56, and a first drive wiring line coupling circuit 58A. The first drive wiring line coupling circuit 58A has the switches SW1 and SW2, and switches the coupling states between the detection electrode drive wiring line 53 and the detection circuit 55, and the coupling states between the detection electrode drive wiring line 53 and the guard signal supply circuit 56. The reference potential supply circuit 57 and a second drive wiring line coupling circuit 58B are provided on the array substrate SUB1. The second drive wiring line coupling circuit 58B has the switch SW3 and switches the coupling states between the reference potential supply circuit 57 and the detection electrode drive wiring line 53.

The input detection system 1A according to the first modification allows the control IC 50A to have a simpler structure than that of the control IC 50 in the embodiment described above. This makes it possible to employ the same structure as the control IC (touch IC) used for what is called a self-electrostatic capacitance type touch detection, thereby allowing reduction of the manufacturing cost of the input detection system 1A.

Second Modification

Figure 14:
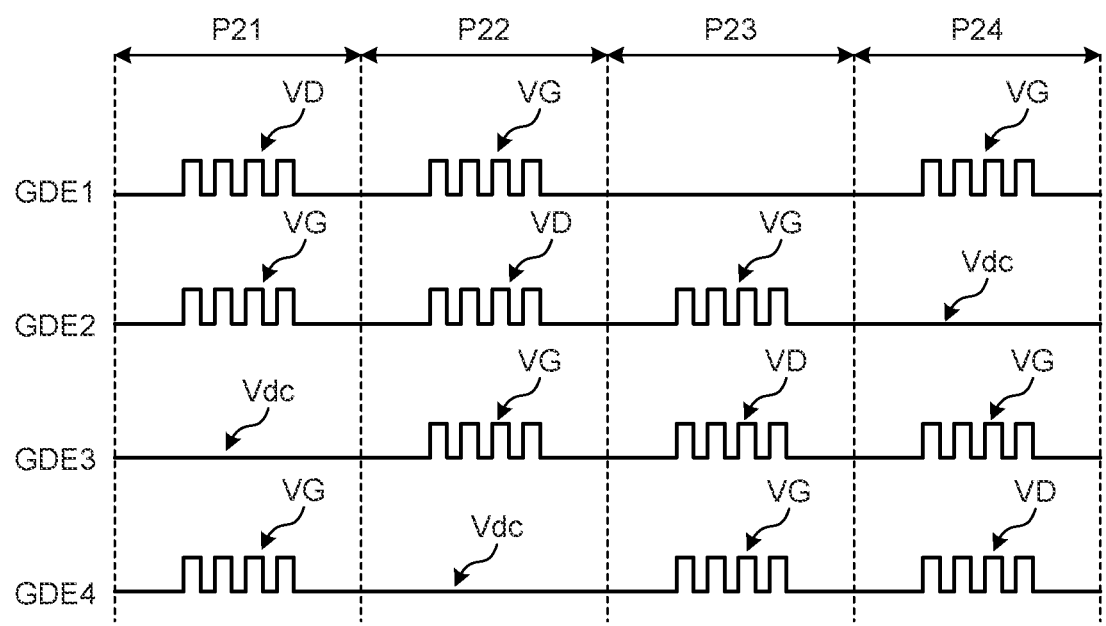
FIG. 14 is a timing waveform chart of the detection electrode groups in the input detection system according to a second modification.

FIG. 14 is a timing waveform chart of the detection electrode groups in the input detection system according to a second modification. As illustrated in FIG. 14, the second modification differs from the embodiment described above in that the guard signal VG is supplied to the detection electrodes DE that are adjacent to the detection electrodes DE to which the detection drive signal VD is supplied.

Specifically, as illustrated in FIG. 14, in the first period P21, the control IC 50 supplies the detection drive signal VD to the detection electrode group GDE1. The control IC 50 supplies the guard signal VG to the detection electrodes DE (the detection electrode group GDE2) adjacent to the detection electrodes DE (the detection electrode group GDE1) to which the detection drive signal VD is supplied. The control IC 50 supplies the guard signal VG to the detection electrode group GDE4. Detection electrode groups GDE5, GDE6, GDE7, and GDE5, which are not illustrated in FIG. 14, are also driven with the same pattern as the detection electrode groups GDE1, GDE2, GDE3, and GDE4, so that the guard signal VG is supplied to the detection electrode group GDE4 adjacent to the detection electrode group GDE5 to which the detection drive signal VD is supplied. The control IC 50 supplies the reference potential Vdc to the detection electrode group GDE3 to which the detection drive signal VD and the guard signal VG are not supplied.

In the second period P22, the control IC 50 supplies the detection drive signal VD to the detection electrode group GDE2. The control IC 50 supplies the guard signal VG to the detection electrode groups GDE1 and GDE3 that are adjacent to the detection electrode group GDE2. The control IC 50 supplies the reference potential Vdc to the detection electrode group GDE4, to which the detection drive signal VD and the guard signal VG are not supplied.

In the third period P23, the control IC 50 supplies the detection drive signal VD to the detection electrode group GDE3. The control IC 50 supplies the guard signal VG to the detection electrode groups GDE2 and GDE4 that are adjacent to the detection electrode group GDE3. The control IC 50 supplies the reference potential Vdc to the detection electrode group GDE1, to which the detection drive signal VD and the guard signal VG are not supplied.

In the fourth period P24, the control IC 50 supplies the detection drive signal VD to the detection electrode group GDE4. The control IC 50 supplies the guard signal VG to the detection electrode group GDE3 adjacent to the detection electrode group GDE4. The control IC 50 supplies the guard signal VG to the detection electrode group GDE1. The control IC 50 supplies the reference potential Vdc to the detection electrode group GDE2, to which the detection drive signal VD and the guard signal VG are not supplied.

In this way, the guard signal VG is supplied to the detection electrodes DE (the detection electrode group GDE) adjacent to the detection electrodes DE (the detection electrode group GDE) to which the detection drive signal VD is supplied. The second modification can prevent the parasitic capacitance between the detection electrodes DE.

Third Modification

Figure 15:
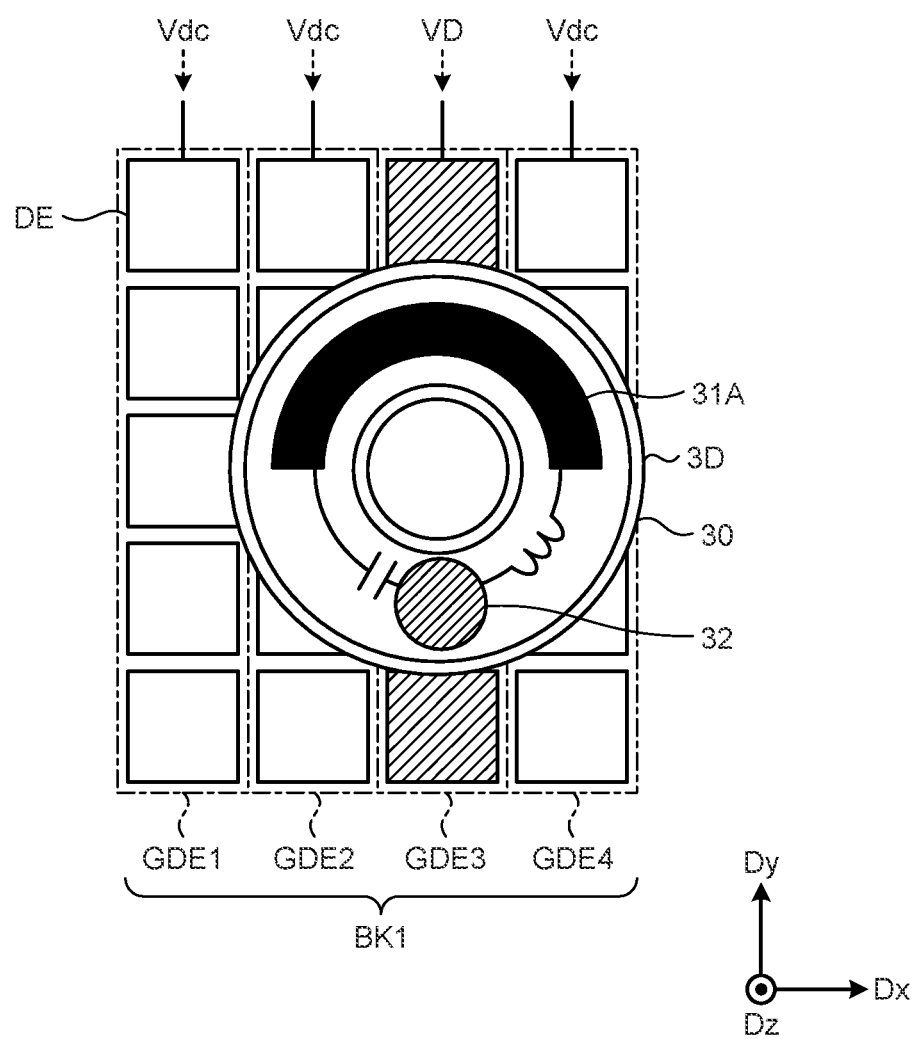
FIG. 15 is a plan view schematically illustrating an arrangement relation between an input support device according to a third modification and the detection electrodes.

FIG. 15 is a plan view schematically illustrating an arrangement relation between an input support device according to a third modification and the detection electrodes. As illustrated in FIG. 15, an input support device 3D according to the third modification includes a first electrode 31A having a different shape from that of the first electrode 31 in the embodiment described above in a plan view. Specifically, the first electrode 31A is formed in an arc-like shape. The second electrode 32 has a circular shape as described in the embodiment. The arc-shaped first electrode 31A and the second electrode 32 are located on opposite sides across the central through-hole.

The area of the first electrode 31A in a plan view is larger than that of the second electrode 32 in a plan view. The area of the first electrode 31A is larger than that of one detection electrode DE while the area of the second electrode 32 is smaller than that of one detection electrode DE. When the first electrode 31A and the second electrode 32 are arranged next to each other in the second direction Dy, the width of the first electrode 31A in the first direction Dx is larger than that of the second electrode 32 in the first direction Dx. The width of the first electrode 31A in the first direction Dx is larger than that of one detection electrode DE in the first direction Dx. The width of the first electrode 31A in the second direction Dy is larger than that of the second electrode 32 in the second direction Dy.

This structure causes the first electrode 31A to be disposed to overlap with the adjacent detection electrodes DE in the first direction Dx even when the second electrode 32 is disposed to overlap with only one detection electrode DE. For example, even when the detection drive signal VD is supplied to the detection electrode group GDE3 and the first electrode 31A and the second electrode 32 are arranged next to each other in the second direction Dy, at least part of the first electrode 31A is disposed to overlap with the adjacent detection electrode groups GDE2 and GDE4. As a result, the reference potential Vdc is supplied to the detection electrodes DE (the detection electrode groups GDE2 and GDE4) that overlap with at least part of the first electrode 31A.

In other words, signals having different potentials are supplied to the first electrode 31A and the second electrode 32, regardless of the direction of the rotation of the input support device 3D. In the example illustrated in FIG. 15, the detection drive signal VD is supplied to the detection electrodes DE (the detection electrode group GDE3) overlapping with the second electrode 32 while the reference potential Vdc is supplied to the detection electrodes DE (the detection electrode groups GDE2 and GDE4) overlapping with the first electrode 31A. The third modification thus structured causes a potential difference between the first electrode 31A and the second electrode 32, thereby making it possible to detect the input support device 3D using the resonance of the LC circuit 35.

Fourth Modification

Figure 16:
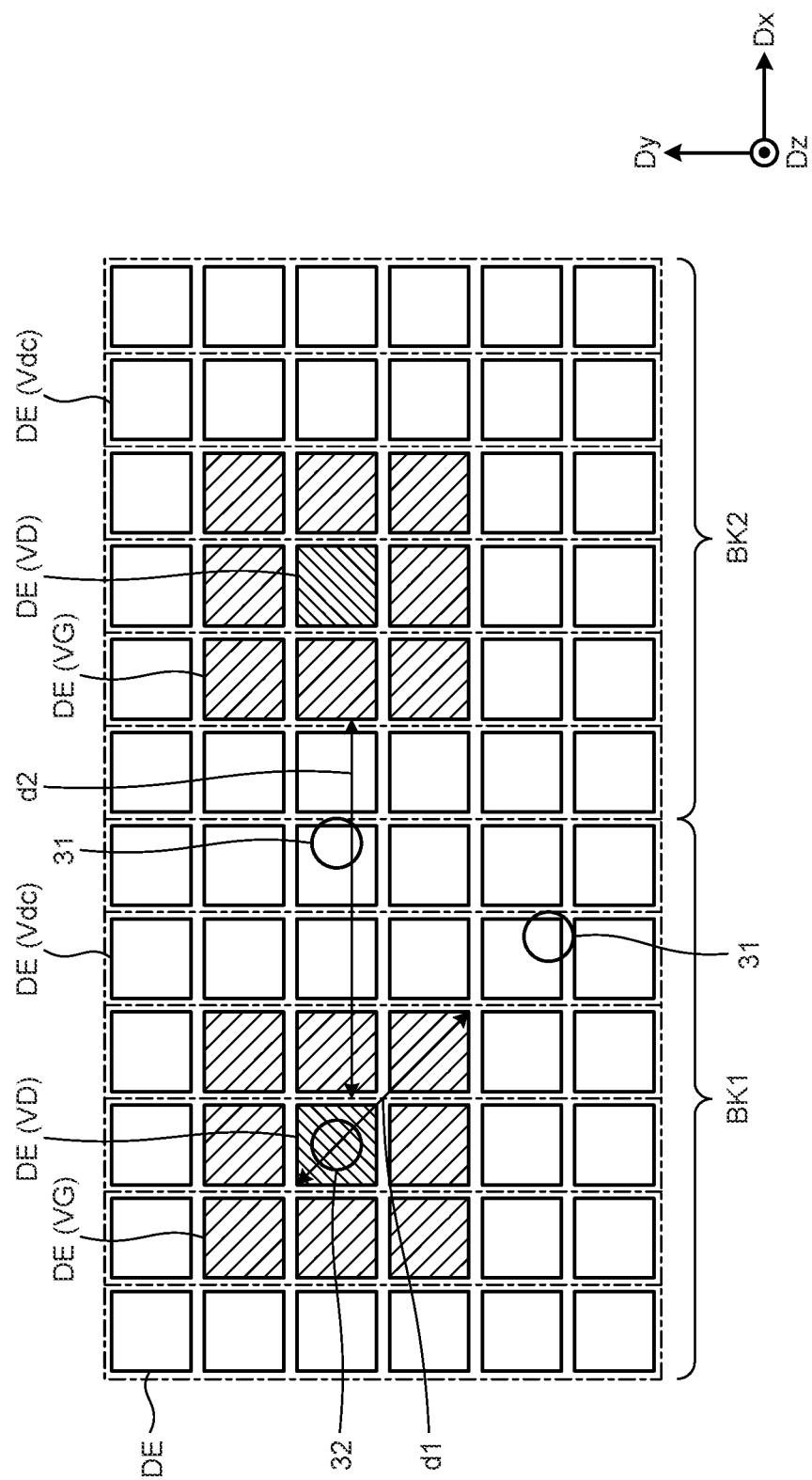
FIG. 16 is a descriptive view for explaining a method for driving the detection electrodes in the input detection system according to a fourth modification.
Figure 17:
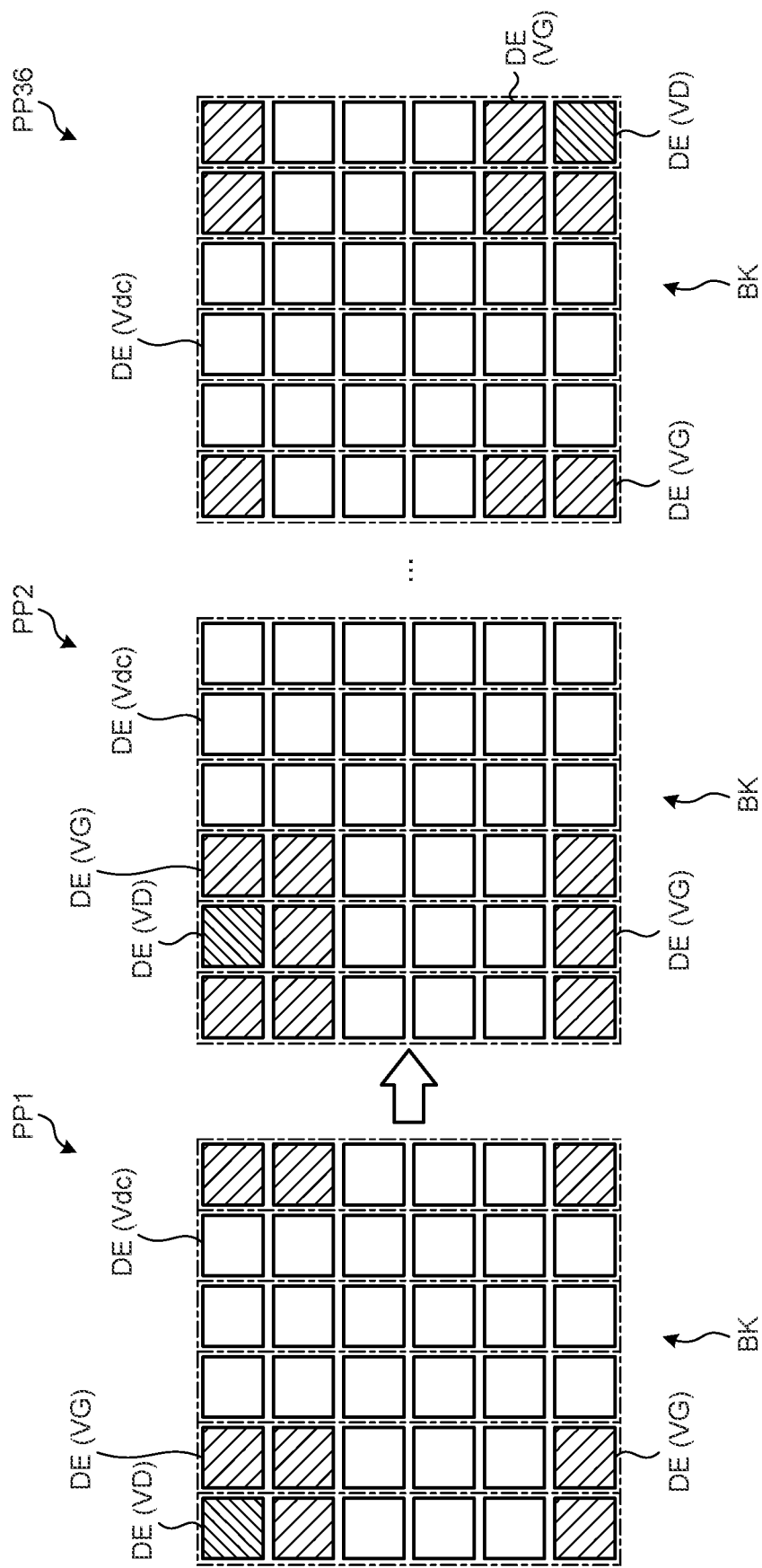
FIG. 17 is a descriptive view for explaining the method for driving the detection electrodes for each of a plurality of detection periods in the input detection system according to the fourth modification.

FIG. 16 is a descriptive view for explaining a method for driving the detection electrodes in the input detection system according to a fourth modification. FIG. 17 is a descriptive view for explaining the method for driving the detection electrodes for each of a plurality of detection periods in the input detection system according to the fourth modification.

In FIGS. 16 and 17, the detection electrode DE (VD) to which the detection drive signal VD is supplied and the detection electrode DE (VG) to which the guard signal VG is supplied are illustrated with different hatchings. The detection electrode DE (Vdc) to which the reference potential Vdc is supplied is illustrated without hatching to distinguish it from the detection electrode DE (VD) and the detection electrode DE (VG).

The embodiment and the modifications described above are the examples in which the detection drive signal VD is supplied to the detection electrodes DE arrayed in the second direction Dy or the first direction Dx at the same time. The supplying is not limited to the examples. As illustrated in FIG. 16, the control IC 50 (refer to FIG. 9) supplies the detection drive signal VD to one of the detection electrodes DE (VD) included in each of the detection electrode blocks BK1 and BK2. The control IC 50 (refer to FIG. 9) supplies the guard signal VG to the eight detection electrodes DE (VG) adjacent to the detection electrode DE (VD) in the detection electrodes DE included in each of the detection electrode blocks BK1 and BK2. The control IC 50 (refer to FIG. 9) supplies the reference potential Vdc to the detection electrodes DE (Vdc) other than the detection electrode DE (VD) and the detection electrodes DE (VG) in the detection electrodes DE included in each of the detection electrode blocks BK1 and BK2.

The detection electrode blocks BK1 and BK2, which are next to each other in the first direction Dx, are driven so as to have the same pattern. In other words, the positional relation among the detection electrode DE (VD), the detection electrodes DE (VG), and the detection electrodes DE (Vdc) in the detection electrode block BK2 matches the positional relation in a case where the positional relation among the detection electrode DE (VD), the detection electrodes DE (VG), and the detection electrodes DE (Vdc) in the detection electrode block BK1 is moved parallel to the first direction Dx. The positional relations are in a similarity relation.

As illustrated in FIG. 16, among the detection electrodes DE, the detection electrodes DE (VD) to which the detection drive signal VD is supplied at the same time are arrayed in plurality with a predetermined interval in the first direction Dx. The distance in the first direction Dx between the two detection electrodes DE (VD) to which the detection drive signal VD is supplied at the same time is larger than the distance between the first electrode 31 and the second electrode 32 (the second distance r2 (refer to FIG. 6)).

The maximum distance between the detection electrode DE (VD) and the detection electrode DE (VG) adjacent to each other in one detection electrode block BK is referred to as a distance d1. In the two adjacent detection electrode blocks BK1 and BK2, the minimum distance between the detection electrode DE (VD) in the detection electrode block BK1 and the detection electrode DE (VG) in detection electrode block BK2 is referred to as a distance d2.

The first distance r1 (refer to FIG. 6) in the input support device 3 is larger than the distance d1. The second distance r2 (refer to FIG. 6) in the input support device 3 is smaller than the distance d2. When the second electrode 32 is disposed to overlap with the detection electrode DE (VD), and r1>d1 and r2<d2, the first electrode 31 does not overlap with the detection electrode DE (VG) adjacent to the detection electrode DE (VD), but is disposed to overlap with the detection electrode DE (Vdc). When the second electrode 32 is disposed to overlap with the detection electrode DE (VD), the first electrode 31 does not overlap with the detection electrode DE (VG) in the adjacent detection electrode block BK, but is disposed to overlap with the detection electrode DE (Vdc) between the detection electrode DE (VG) in the detection electrode block BK1 and the detection electrode DE (VG) in the detection electrode block BK2.

As illustrated in FIG. 17, the control IC 50 (refer to FIG. 9) selects sequentially one detection electrode DE (VD) from the detection electrodes DE in the detection electrode block BK, and supplies the detection drive signal VD to the selected detection electrode DE (VD). The control IC 50 also changes sequentially the drive pattern of the detection electrodes DE (VG) and the detection electrodes DE (Vdc) according to the position of the detection electrode DE (VD).

For example, in the first period PP1, the detection drive signal VD is supplied to the detection electrode DE (VD) located at the upper left in the detection electrode block BK. In the second period PP2, the detection drive signal VD is supplied to the detection electrode DE (VD) at the position shifted in the first direction Dx from the position of the detection electrode DE (VD) in the first period PP 1. The control IC 50 scans the detection electrode DE to which the detection drive signal VD is supplied for each row. In the 36th period PP36, the control IC 50 supplies the detection drive signal VD to the detection electrode DE (VD) located at the lower right in the detection electrode block BK.

Although the two detection electrode blocks BK1 and BK2 are illustrated in FIG. 16, two or more detection electrode blocks BK may be arrayed in the first direction Dx and the second direction Dy. One detection electrode block BK has 6 rows and 6 columns, for a total of 36 detection electrodes DE, but the number of detection electrodes DE is not limited thereto. One detection electrode block BK may have 37 or more detection electrodes DE, or 35 or less. The number of rows of the detection electrode block BK may differ from the number of columns. The drive pattern in FIG. 17 is only an example, and the order of the detection electrodes DE (VD) may be appropriately changed. The control IC 50 may supply sequentially the detection drive signal VD to a plurality of the detection electrodes DE (VD) in one detection electrode block BK.

Fifth Modification

Figure 18:
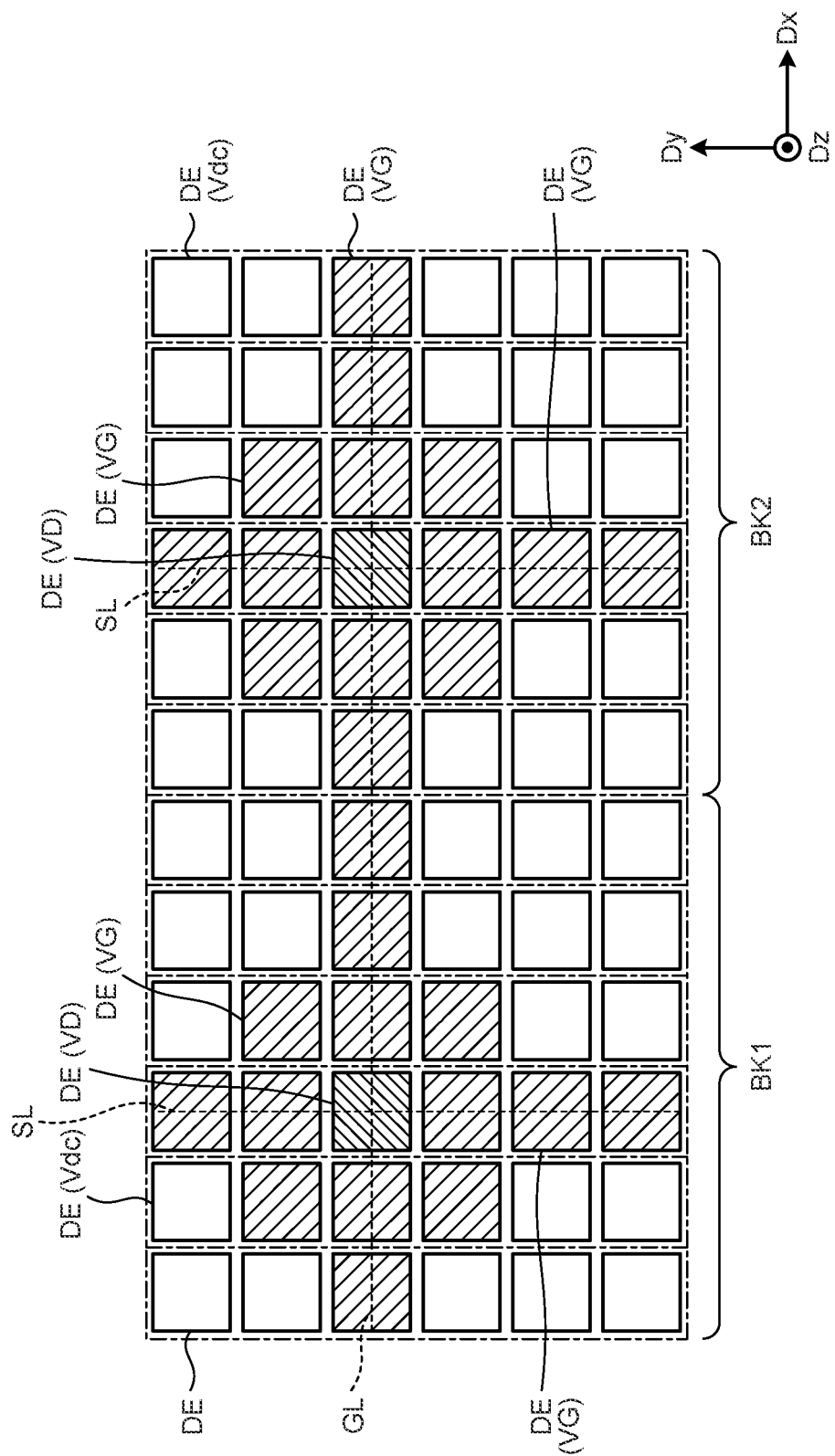
FIG. 18 is a descriptive view for explaining a method for driving the detection electrodes in the input detection system according to a fifth modification.

FIG. 18 is a descriptive view for explaining a method for driving the detection electrodes in the input detection system according to a fifth modification. As illustrated in FIG. 18, the fifth modification differs from the fourth modification in that the guard signal VG is supplied to a plurality of the detection electrodes DE (VG) arrayed in the same row as the detection electrode DE (VD) and a plurality of the detection electrodes DE (VG) arrayed in the same column as the detection electrode DE (VD).

With respect to the pixel signal line SL that overlaps with the detection electrode DE (VD) and extends in the second direction Dy, the control IC 50 supplies the guard signal VG to each of the detection electrodes DE (VG) that are arrayed in the second direction Dy to overlap with the pixel signal line SL. In other words, the control IC 50 does not supply the reference potential Vdc to the detection electrodes DE that are arrayed to overlap with the pixel signal line SL.

With respect to the scan line GL that overlaps with the detection electrode DE (VD) and extends in the first direction Dx, the control IC 50 supplies the guard signal VG to each of the detection electrodes DE (VG) that are arrayed in the first direction Dx to overlap with the scan line GL. In other words, the control IC 50 does not supply the reference potential Vdc to the detection electrodes DE that are arrayed to overlap with the scan line GL.

This structure prevents the parasitic capacitance between the pixel signal line SL and the scan line GL to which the guard signal VG is supplied and the parasitic capacitance between the detection electrode DE (VD) and the detection electrode DE (VG), even when the guard signal VG is supplied to the pixel signal line SL and the scan line GL in the detection period as illustrated in FIG. 12. The fifth modification can more reduce time constants of the pixel signal lines SL and the scan lines GL than those in the fourth modification. As a result, the reduction in detection accuracy can be prevented.

Sixth Modification

Figure 19:
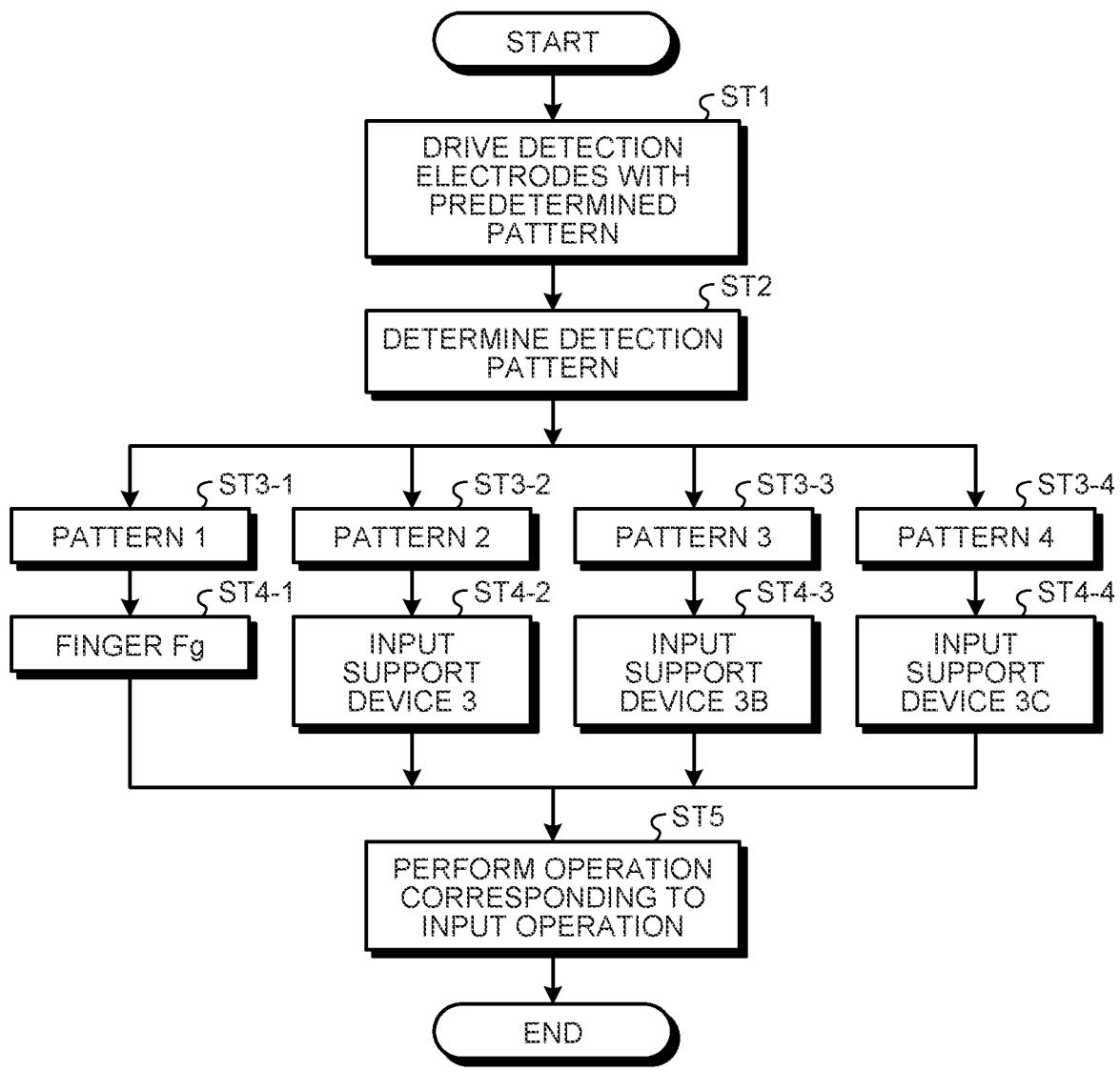
FIG. 19 is a flowchart for explaining the method for detecting the input support device in the input detection system according to a sixth modification.

FIG. 19 is a flowchart for explaining the method for detecting the input support device in the input detection system according to a sixth modification. As illustrated in FIG. 19, the control IC 50 drives the detection electrodes DE with a predetermined pattern (step ST1). The control IC 50 may supply the detection drive signal VD for each detection electrode group GDE composed of the detection electrodes DE arrayed in the second direction Dy as an example of the predetermined pattern. Alternatively, the control IC 50 may supply the detection drive signal VD sequentially for each detection electrode DE.

The detection circuit 55 detects the detection signal Vdef based on the self-electrostatic capacitance change of the detection electrode DE. The host IC 100 (refer to FIG. 9) receives the output voltage Vo from the control IC 50 and performs the predetermined calculation processing. The determination circuit 101 (refer to FIG. 9) compares the detection pattern of the calculation result with the information in the storage circuit 102 and determines the detection pattern (step ST2).

For example, the determination circuit 101 compares the detection pattern from the control IC 50 with the information about pattern 1 stored in the storage circuit 102 (step ST3-1). If it is determined that both patterns are identical or similar, the determination circuit 101 determines that the detection target is the finger Fg (step ST4-1).

The determination circuit 101 compares the detection pattern from the control IC 50 with the information about pattern 2 stored in the storage circuit 102 (step ST3-2). If it is determined that both patterns identical or similar, the determination circuit 101 determines that the detection target is the input support device 3 (step ST4-2).

The determination circuit 101 compares the detection pattern from the control IC 50 with the information about pattern 3 stored in the storage circuit 102 (step ST3-3). If it is determined that both patterns identical or similar, the determination circuit 101 determines that the detection target is the slider (the input support device 3B) (step ST4-3).

The determination circuit 101 compares the detection pattern from the control IC 50 with the information about pattern 4 stored in the storage circuit 102 (step ST3-4). If it is determined that both patterns identical or similar, the determination circuit 101 determines that the detection target is the button (the input support device 3C) (step ST4-4).

The host IC 100 outputs a command to the control IC 50 to perform the operation corresponding to the input operation on the basis of the information about the type of the detection target, input position information, and the like.

The flowchart illustrated in FIG. 19 is only an example and may be appropriately modified.

Seventh Modification

Figure 20:
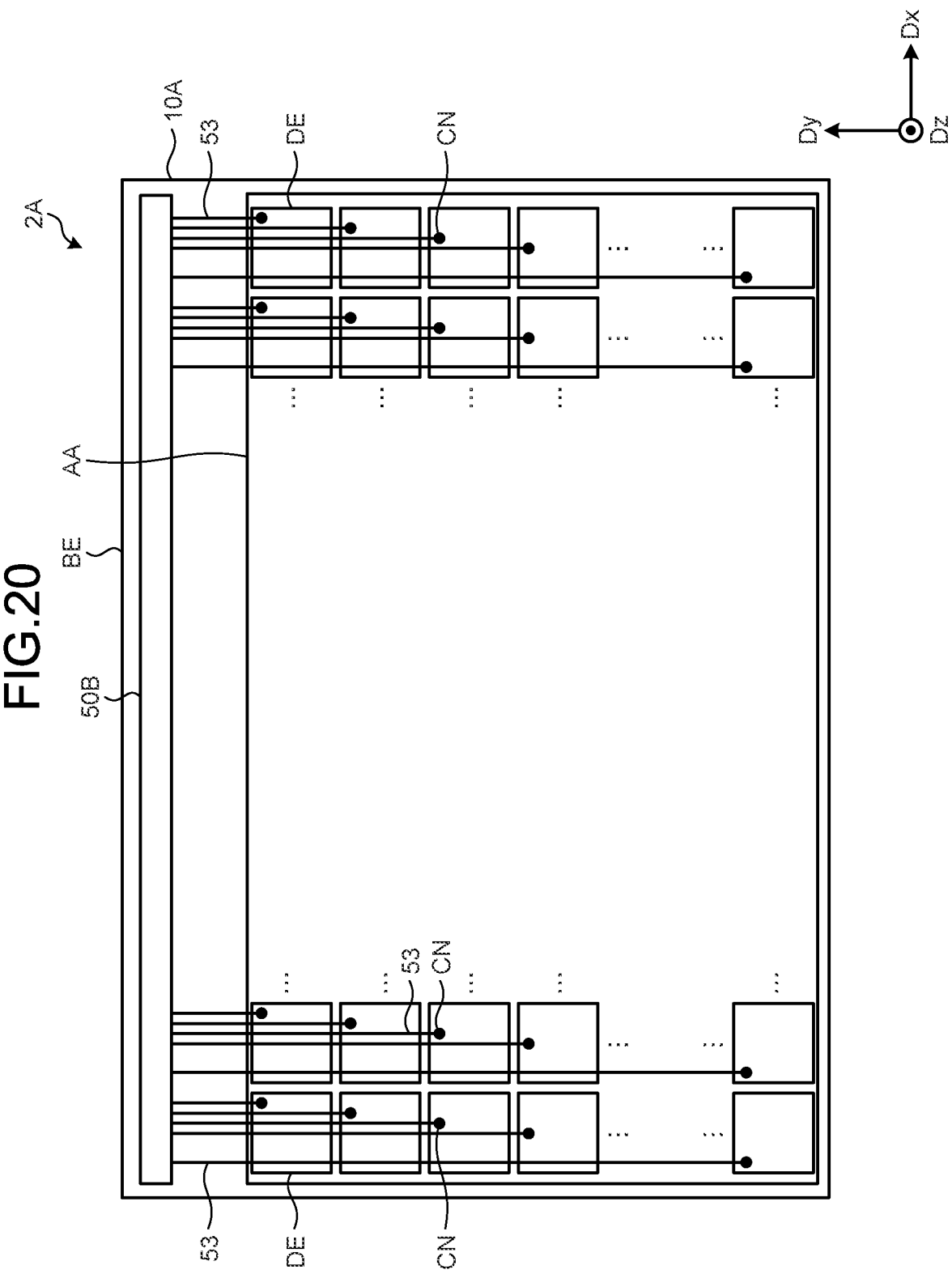
FIG. 20 is a plan view schematically illustrating a detecting device in the input detection system according to a seventh modification.

FIG. 20 is a plan view schematically illustrating the detecting device of the input detection system according to a seventh modification. In the embodiment and the first to the sixth modifications that are described above, the input detection systems 1 and 1A include the display device 2 with the detection function. The seventh modification differs from the input detection systems 1 and 1A in terms of a detecting device 2A instead of the display device 2.

As illustrated in FIG. 20, the detecting device 2A includes a substrate 10A and a plurality of detection electrodes DE arrayed in the detection region AA of the substrate 10A. The detection electrodes DE are arrayed in a matrix with a row-column configuration in the detection region AA. The detecting device 2A is a touch panel, for example. The detecting device 2A may be overlaid on the display device or may be provided separately from the display device. In other words, the input detection system in the seventh modification may not include the display device. The input detection system in the seventh modification may include at least the detecting device 2A and the input support device 3 disposed on the detecting device 2A. The drive pattern of the detection electrodes DE can employ the drive pattern of each detection period in the embodiment and modifications described above.

Eighth Modification

Figure 21:
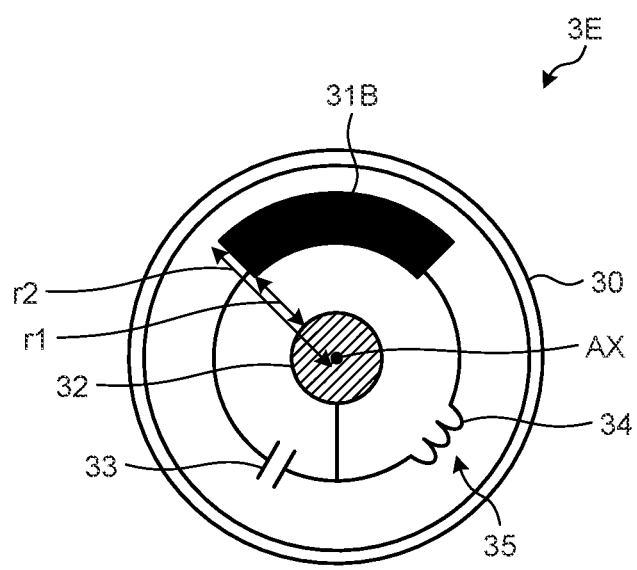
FIG. 21 is a plan view schematically illustrating an input support device according to an eighth modification.

FIG. 21 is a plan view schematically illustrating an input support device according to an eighth modification. As illustrated in FIG. 21, this input support device 3E in the eighth modification has a circular shape without hollow. The second electrode 32 is provided inside the housing 30 at a position overlapping with the rotation axis AX. A first electrode 31B is formed in an arc-like shape that forms a part of a circle concentric with the second electrode 32. When the rotation operation R is performed around the rotation axis AX, the position of the second electrode 32 is fixed and the first electrode 31B rotates around the rotation axis AX (the second electrode 32). In other words, the position of one (the second electrode 32) of the first electrode 31B and the second electrode 32 is fixed while the other (the first electrode 31B) of the first electrode 31B and the second electrode 32 can be displaced.

In the input support device 3E in the eighth modification, the area of the first electrode 31B in a plan view is larger than that of the second electrode 32 in a plan view in the same way as the input support device 3D illustrated in FIG. 15. When the first electrode 31B and the second electrode 32 are arranged next to each other in the second direction Dy, the width of the first electrode 31B in the first direction Dx is larger than that of the second electrode 32 in the first direction Dx. The width of the first electrode 31B in the second direction Dy is larger than that of the second electrode 32 in the second direction Dy.

The shapes of the first electrode 31B and the second electrode 32 in a plan view are not limited to the example illustrated in FIG. 21, and may be appropriately modified. For example, the first electrode 31B may have a circular shape in the same manner as the second electrode 32.

Although the preferred embodiment of the present disclosure has been described above, the present disclosure is not limited by the embodiment. Contents disclosed in the embodiment are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system, comprising:
a plurality of detection electrodes arrayed in a detection region, the detection electrodes being at least three detection electrodes; and
an input support device that includes an LC circuit, a first electrode coupled to one end side of the LC circuit, and a second electrode coupled to the other end side of the LC circuit, wherein
the input support device is disposed to overlap with some of the detection electrodes,
a fixed potential is supplied to a detection electrode overlapping with the first electrode, among the at least three detection electrodes, and a detection drive signal is supplied to a detection electrode overlapping with the second electrode, among the at least three detection electrodes.

2. The input detection system according to claim 1, wherein
the first electrode is capable of being disposed to overlap with any of the at least three detection electrodes,
the first electrode overlaps with at least one of the detection electrodes to which the fixed potential is supplied, and
the second electrode is disposed to overlap with at least one of the detection electrodes different from the at least one of the detection electrodes with which the first electrode overlaps.

3. The input detection system according to claim 1, wherein a guard signal synchronized with the detection drive signal is supplied to a detection electrode adjacent to the detection electrode to which the detection drive signal is supplied.

4. The input detection system according to claim 1, wherein the detection electrodes each output a detection signal on the basis of a self-electrostatic capacitance.

5. The input detection system according to claim 1, wherein the detection electrodes are arrayed in a matrix with a row-column configuration in the detection region.

6. The input detection system according to claim 1, wherein the detection drive signal is supplied to a plurality of the detection electrodes arranged in a row direction or a column direction at a same time.

7. The input detection system according to claim 1, wherein
among the detection electrodes, the detection electrodes to which the detection drive signal is supplied at a same time are arrayed in plurality with a predetermined interval in a first direction, and
a distance in the first direction between the two detection electrodes to which the detection drive signal is supplied at the same time is larger than a distance between the first electrode and the second electrode.

8. The input detection system according to claim 1, wherein
an area of the first electrode is larger than an area of the detection electrode, and
an area of the second electrode is smaller than the area of the detection electrode.

9. The input detection system according to claim 8, wherein the first electrode is disposed to overlap with the adjacent detection electrodes.

10. The input detection system according to claim 1, wherein the input support device has a circular shape in a plan view from a direction perpendicular to an upper surface of the detection region.

11. The input detection system according to claim 1, wherein the input support device has a bar-like shape in a plan view from a direction perpendicular to an upper surface of the detection region.

12. The input detection system according to claim 1, wherein
a position of one of the first and second electrodes is fixed, and
the other of the first and second electrodes is capable of being displaced.

13. The input detection system according to claim 1, further comprising a display device including a plurality of pixel electrodes and a common electrode provided to face the pixel electrodes, wherein
the detection electrode serves also as the common electrode.

14. The input detection system according to claim 13, wherein a display period and a detection period are arranged in a time division manner.

15. The input detection system according to claim 13, further comprising pixel signal lines and scan lines that are provided corresponding to the pixel electrodes, wherein
a guard signal synchronized with the detection drive signal is supplied to at least either the pixel signal lines or the scan lines.

16. The input detection system according to claim 1, wherein
the fixed potential supplied to the first detection electrode is supplied by a capacitive coupling between the first electrode and the detection electrode overlapping with the first electrode, and
a detection drive signal supplied to the second detection electrode is supplied by a capacitive coupling between the second electrode and the detection electrode overlapping with the second electrode.

17. The input detection system according to claim 1, wherein
the at least three detection electrodes are sequentially driven, while each other electrode of the at least three detection electrodes not driven are supplied with the fixed potential, and
a detection is performed when the second electrode overlaps a detection electrode that is driven, among the at least three detection electrodes.

18. The input detection system according to claim 1, wherein
an area of the first detection electrode is greater than an area of the second detection electrode.

* * * * *